Sept. 24, 1940.  J. B. ARMITAGE  2,215,684
MACHINE TOOL
Original Filed June 22, 1936   8 Sheets-Sheet 1
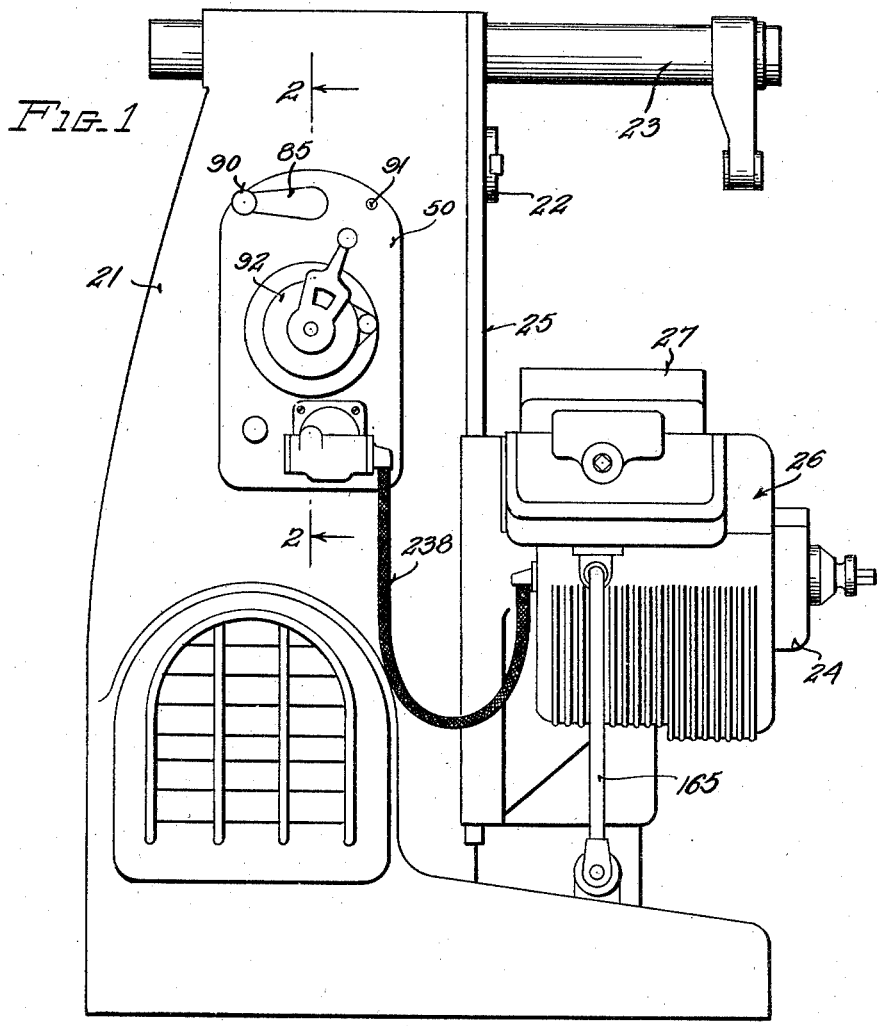
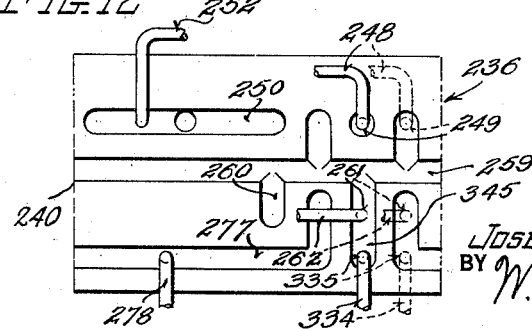
INVENTOR
JOSEPH B. ARMITAGE
BY W. D. O'Connor
ATTORNEY

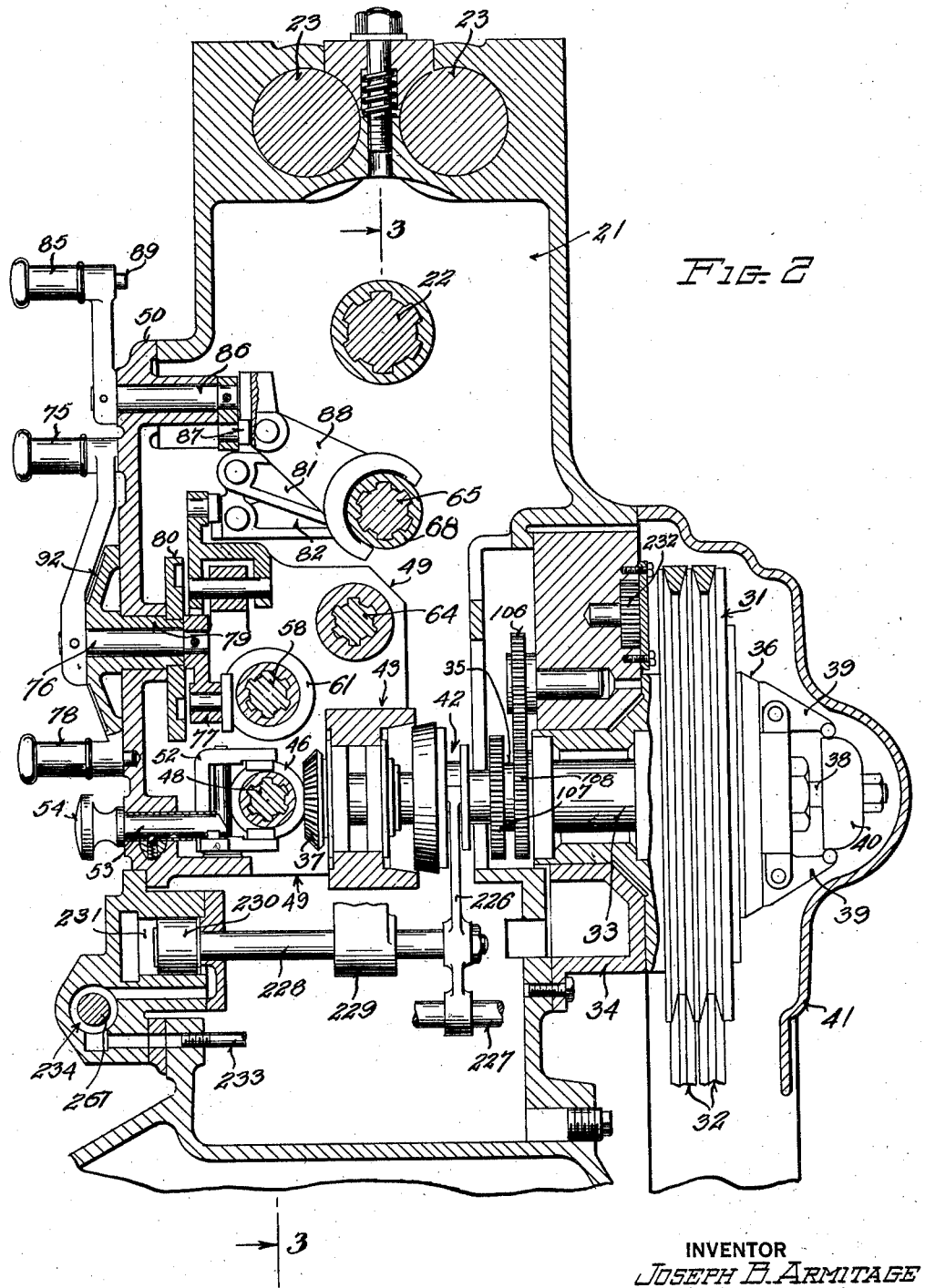

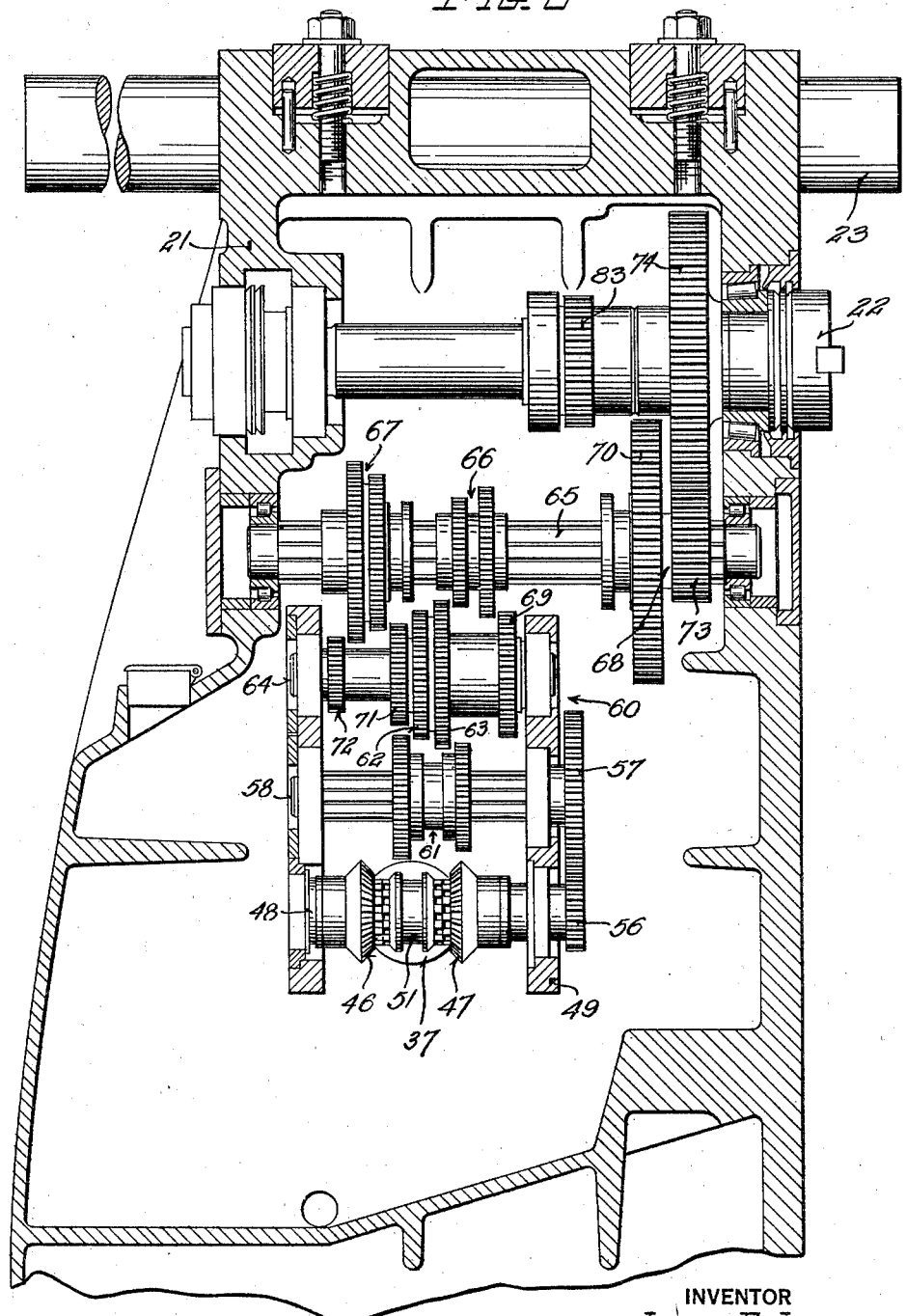

Sept. 24, 1940.   J. B. ARMITAGE   2,215,684
MACHINE TOOL
Original Filed June 22, 1936   8 Sheets-Sheet 4
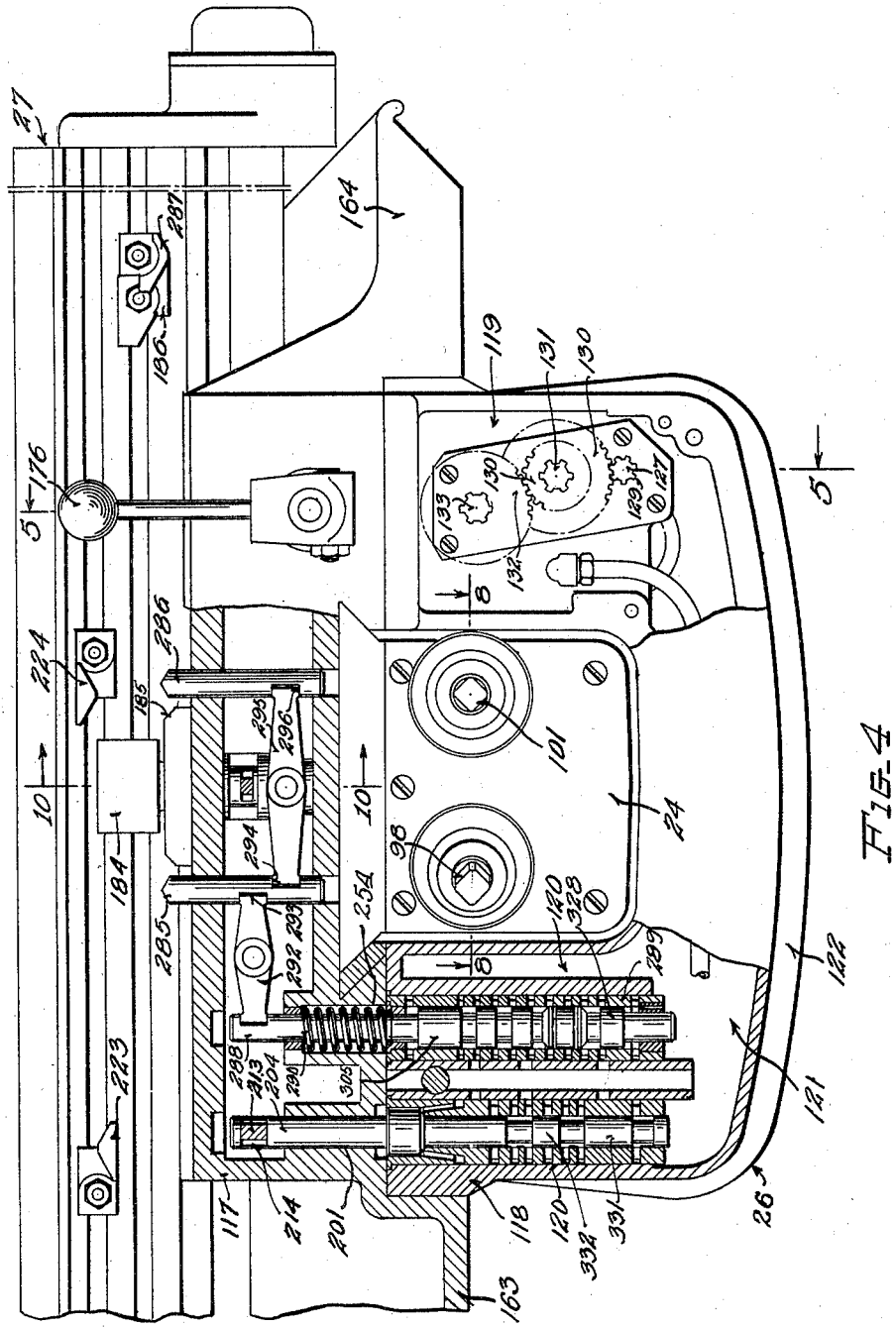
INVENTOR
JOSEPH B. ARMITAGE
BY W. D. O'Connor
ATTORNEY Sept. 24, 1940.  J. B. ARMITAGE  2,215,684
MACHINE TOOL
Original Filed June 22, 1936   8 Sheets-Sheet 5
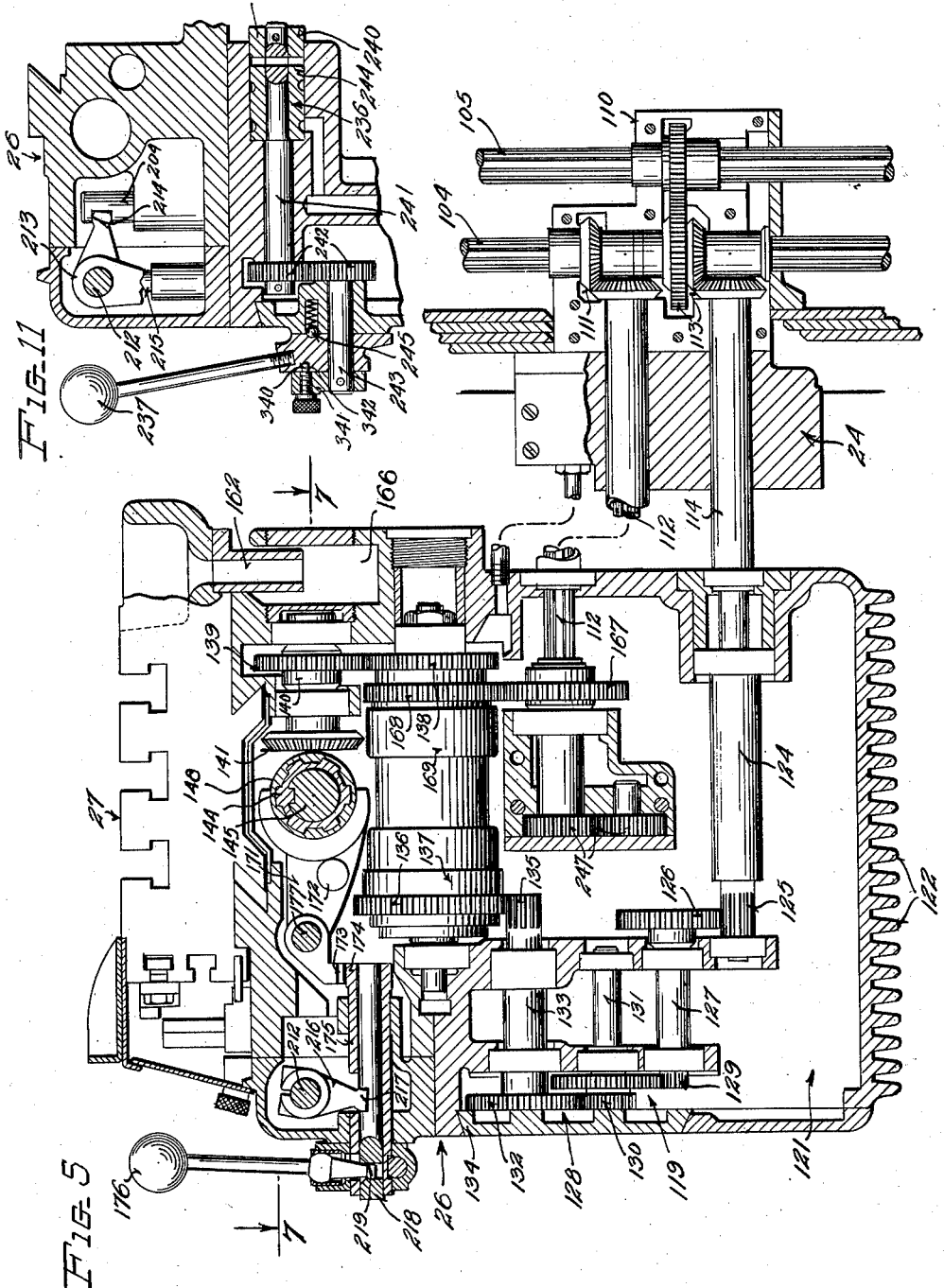
INVENTOR
JOSEPH B. ARMITAGE
BY W. D. O'Connor
ATTORNEY Sept. 24, 1940.   J. B. ARMITAGE   2,215,684
MACHINE TOOL
Original Filed June 22, 1936   8 Sheets-Sheet 6
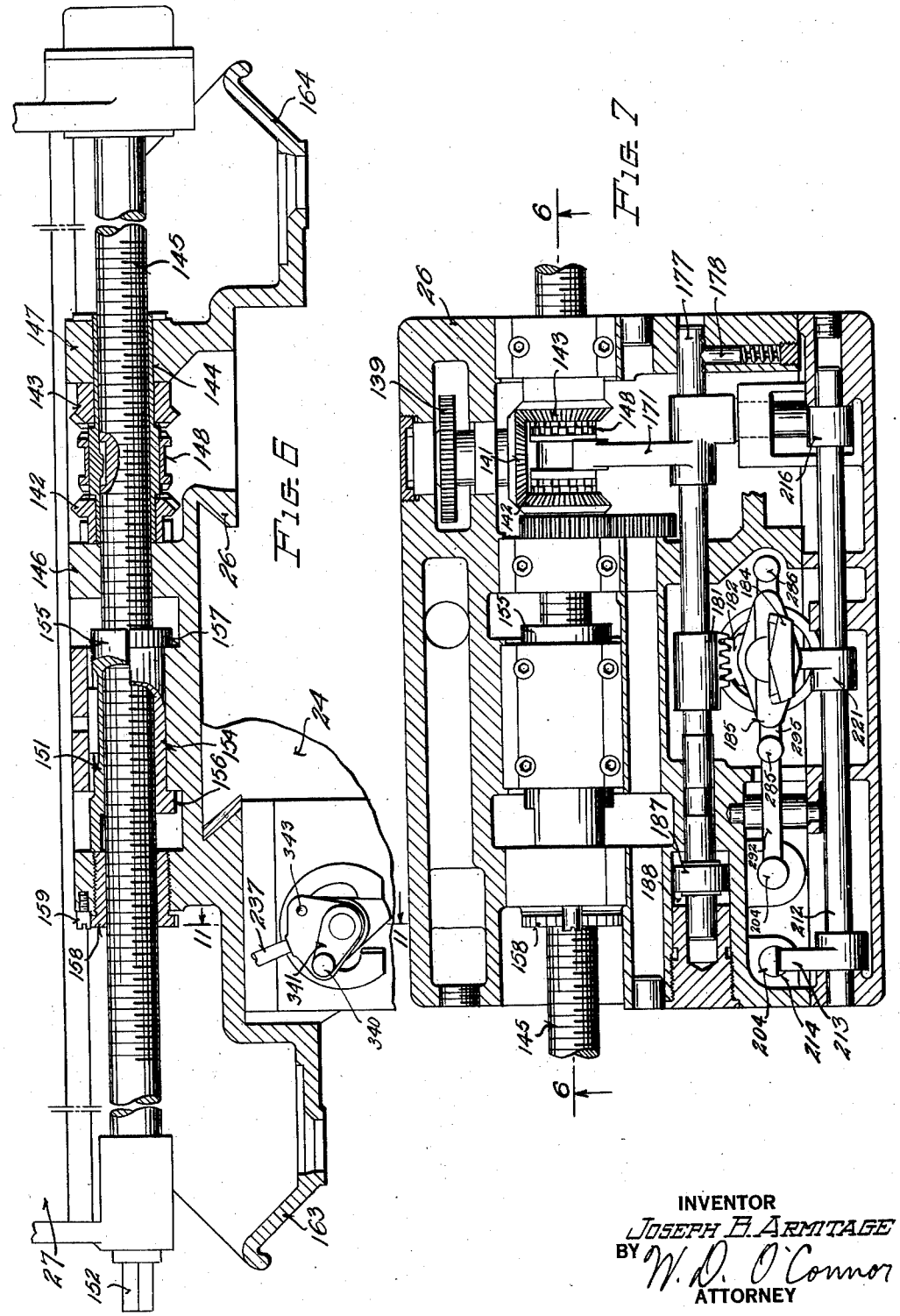
INVENTOR
JOSEPH B. ARMITAGE
BY W. D. O'Connor
ATTORNEY

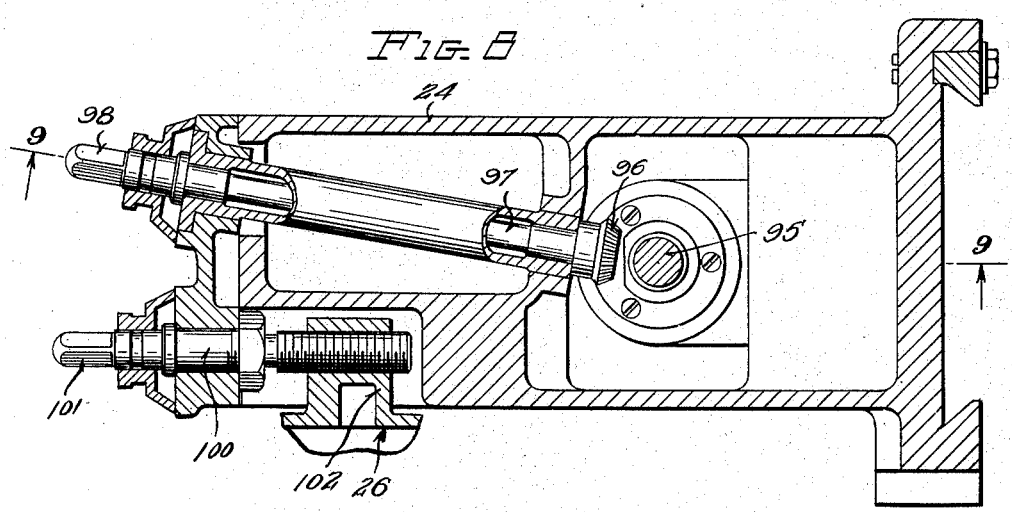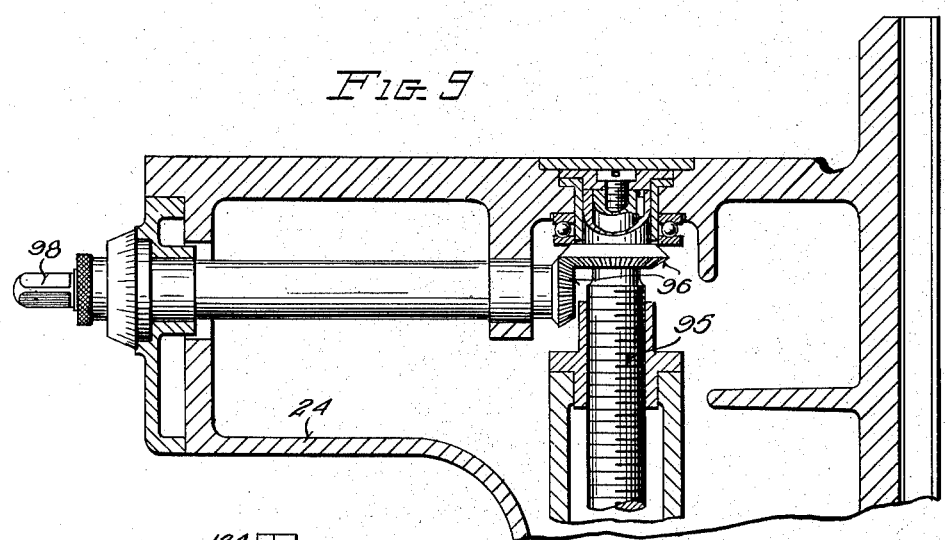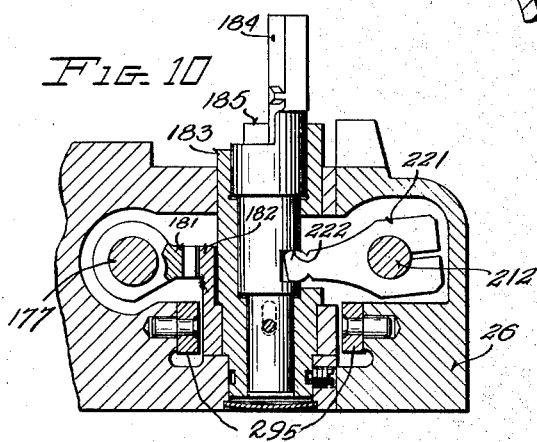

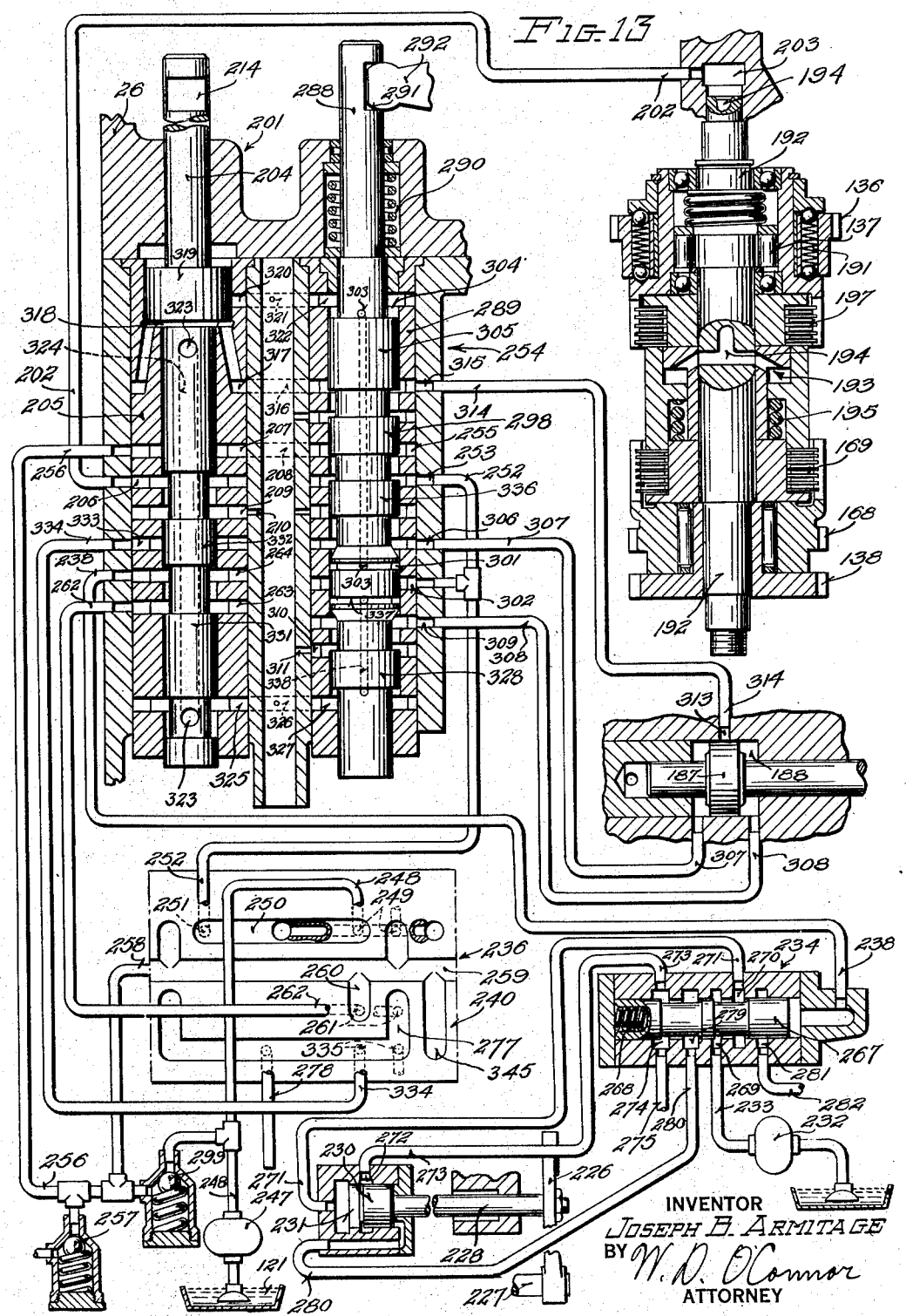

Patented Sept. 24, 1940

2,215,684

UNITED STATES PATENT OFFICE 2,215,684

MACHINE TOOL

Joseph B. Armitage, Wauwatosa, Wis., assignor to Kearney & Trecker Corporation, West Allis, Wis., a corporation of Wisconsin Application June 22, 1936, Serial No. 86,559
Renewed December 17, 1938

70 Claims. (Cl. 90—21)

This invention relates, generally, to improvements in machine tools, and more particularly to a milling machine of novel construction provided with improved operating and controlling mechanism for effecting movements of the work supporting and the tool supporting elements, thereof.

A general object of the invention is to provide a milling machine of improved design that is adapted for convenient and rapid operation and that is of simple and rugged construction.

Another object of the invention is to provide a milling machine that is especially adapted for rapid automatic operation.

Another object is to provide a milling machine of the knee and column type in which all of the feed rate changing gearing and the controls for power operation of the work feeding mechanism are carried by an improved saddle structure.

Another object is to provide a milling machine having an improved saddle structure adapted to support the work-holding table at minimum distance above the knee.

Another object is to provide a milling machine having a knee and saddle structure of novel construction with compartments in the saddle for rate changing and control mechanism.

Another object is to provide a milling machine having a hollow saddle disposed to encircle the knee in manner to provide an oil reservoir in the saddle beneath the knee.

Another object is to provide a milling machine saddle arranged to contain a relatively large quantity of liquid and provided with cooling fins for cooling the liquid therein.

Another object is to provide a milling machine in which the operation of the tool spindle is controlled by mechanism mounted on the saddle.

Another object is to provide control means carried on the saddle of a milling machine for stopping the machine spindle automatically when the table is to be operated at rapid traverse rate.

Another object of the invention is to provide a hydraulic control system for a milling machine arranged to control the operation of apparatus in the machine column from control means on a movable work supporting element, in which only a single hydraulic connection is required from the movable member to the column.

Another object is to provide an improved transmission and improved control means therefor, particularly where different transmission portions to be controlled are carried by relatively movable structure portions and especially where certain of the control mechanisms for the different transmission portions are dependently operative or interlocked for dependent or simultaneous transmission effects.

Another object is to provide an improved power shifting means for the shiftable elements of a machine tool transmission, and preferably of hydraulically operable form, and in a form for improved dependent or simultaneous operation of different shifters, and especially where different of the shifters are carried by relatively movable supports.

Another object of the invention is to provide a hydraulic control system in which a primary source of pressure is arranged to actuate a mechanism and a secondary source of pressure is arranged to exert pressure through a single passageway upon a pilot valve to control the actuation of the mechanism by the primary source.

Another object is to provide improved power shifting means for different machine tool transmission elements in which different of the shifters are provided with different power sources, particularly where the shifters are hydraulically operable; but the control means for the different shifters are power operable dependently or simultaneously from a common power source, at least as to certain control functions; and particularly where the control means is hydraulically operable, and especially where the different control devices or shifter devices are carried by different relatively movable supports.

Another object is to provide a power operable shifter for a machine tool transmission controlled to be alternately shifted to different positions from a single pressure fluid channel in accordance with pressure variations in the channel, particularly where the structure and arrangement is such that the channel connects between different relatively movable supports carrying different portions of the mechanism, and especially where the shifter is to be operated dependently or simultaneously with another shifter or controller carried by a relatively movable support.

Another object is to provide a shifter device primarily operated from one fluid pressure source and a control device for the shifter which is operated from another pressure fluid source, particularly where the shifter and controller are relatively movable, and especially where the controller is associated with other controllers to be dependently or simultaneously operated.

Another object is to provide improved power shifting means for machine tool transmission elements in which certain of the control members for effecting power connection with the different shifters are hydraulically operable and in a form for dependent or simultaneous operation thereof, or for operation selectively dependently or independently.

Another object is to provide a hydraulic control system for a machine tool wherein a pump in the frame of the machine is arranged to operate mechanism therein in accordance with the position of a pilot valve associated therewith, the pilot valve being actuated by a second pump carried by a movable work supporting element of the machine and acting through a single hydraulic lead extending from the work support to the frame.

A further object is to provide, in a hydraulic control system for a machine tool, a control valve that may be turned by means of a manual control lever through a predetermined operating angle to effect a control operation, and that may be adjusted angularly relative to its manual control lever to a position effecting a different control action when the lever is turned through the predetermined operating angle.

A further object is to provide an improved hydraulically operated rapid traverse clutch for a machine tool.

A further object is to provide means for preventing coasting of a movable element of a machine tool when the rate of movement thereof is changed from rapid traverse rate to feed rate.

Another object is to provide work support transmission and control mechanism similar to that shown in the co-pending applications Serial No. 36,766, filed August 19, 1935, Patent No. 2,077,434, April 20, 1937, and Serial No. 65,774, filed February 26, 1936, Patent No. 2,118,357, May 24, 1938, but in an improved and simplified form and especially in a form particularly adapted to use in knee type milling machines.

According to this invention as it is embodied in a milling machine of the knee and column type, the control mechanism for effecting movement of the work supporting table is carried by a saddle of novel construction slidably mounted on the knee, and power for actuating the table at feed rate and at rapid traverse rate respectively is transmitted to the mechanism in the saddle by means of two independent constant speed shafts, the feed rate shaft being driven by the spindle operating clutch and the rapid traverse shaft being driven independently of the spindle clutch.

In order to form a rigid and strong construction accommodating all of the control mechanism, and to provide for a generous supply of lubricating and actuating liquid, the saddle structure is made hollow in generally annular configuration and is disposed to encircle the knee in such manner that the knee protrudes through a central opening therein. Manually operable means for effecting vertical movement of the knee and horizontal movement of the saddle are mounted in the knee in manner to be operable from the front thereof. The hollow saddle houses feed rate changing mechanism and rapid traverse mechanism in a compartment disposed at one side of the knee, and at the other side of the knee it houses hydraulic control mechanism, the lower portion of the saddle beneath the knee serving as a reservoir of large capacity for the actuating liquid. Fins are formed circumferentially on the lower part of the saddle to act as stiffening ribs and to present cooling surfaces for cooling the liquid in the reservoir. The hydraulic control mechanism in the saddle is operated by a pressure pump therein and is arranged to effect automatic reversing of the direction of table movement by trip dogs on the table, movement of the table being at all times under the control of a manual control lever mechanically connected in manner to operate independently of the trip dogs. To control the operation of the tool spindle, there is provided in the column a hydraulically operated main clutch having a spring urged pilot valve arranged to be actuated by pressure exerted through a single flexible conduit from the pump in the saddle, both manually controlled and automatically actuated means being provided on the saddle for controlling the actuation of the pilot valve to thereby control the operation of the main clutch by means of pressure from a pump in the column. A special control valve is provided that may be adjusted to effect both manual and automatic control of the spindle clutch or to effect manual control only thereof. Automatic reversing of the table at rapid traverse rate is effected by the hydraulic control system acting upon a hydraulically actuated rapid traverse clutch of improved design.

The foregoing and other objects of the invention which will become more fully apparent from the following detailed specification, may be achieved by the particular machine tool described herein by way of example, as illustrating a preferred embodiment of the invention, in connection with the accompanying drawings, in which:

Figure 1 is a view in left side elevation of a milling machine of the knee and column type embodying the features of this invention.

Fig. 2 is a vertical sectional view through the column taken on the line 2—2 of Fig. 1 showing the main drive pulley and speed change mechanism.

Fig. 3 is a vertical sectional view through the column taken on the line 3—3 of Fig. 2 showing the spindle drive mechanism and speed change gears.

Fig. 4 is a view in front elevation of the milling machine work supporting structure with parts broken away to show the driving and control mechanism.

Fig. 5 is a developed view of the work supporting mechanism taken substantially along the line 5—5 of Fig. 4 and showing the driving mechanism for actuating the work supporting table.

Fig. 6 is a vertical longitudinal sectional view of the work supporting table taken substantially along the line 6—6 of Fig. 7.

Fig. 7 is a horizontal sectional view of the saddle taken on the line 7—7 of Fig. 5.

Fig. 8 is a horizontal sectional view of the milling machine knee taken on the line 8—8 of Fig. 4.

Fig. 9 is a view in vertical section of the knee taken substantially along the line 9—9 of Fig. 8.

Fig. 10 is a vertical sectional view of the table controlling trip mechanism taken substantially along the line 10—10 of Fig. 4.

Fig. 11 is a vertical sectional view of part of the saddle taken substantially along the line 11—11 of Fig. 6, showing the spindle clutch controlling valve.

Fig. 12 is a diagrammatic view showing the development of the spindle clutch controlling valve.

Fig. 13 is a schematic diagram of the hydraulic control system incorporated in the milling machine.

Referring more particularly to the drawings, the milling machine therein illustrated as a preferred embodiment of this invention is of the well-known knee and column type. As shown in Fig. 1, the machine comprises generally an upstanding column or frame 21 that has rotatably mounted in its upper part a horizontal tool supporting spindle 22, and that has slidably mounted above the spindle the usual overarms 23 disposed in cooperating relation thereto. Beneath the tool spindle 22 there is provided superimposed relatively movable work supporting members including a knee 24 that projects from the column 21 and is slidably mounted on the forward face 25 thereof for vertical movement therealong. Slidably mounted upon the knee 24 for horizontal cross movement toward and from the column face 25, is a saddle structure 26 of novel construction that supports on the top thereof a horizontal work supporting table 27 for longitudinal reciprocatory movement tranversely to the direction of movement of the saddle 26, whereby a work piece thereon may be moved in cooperative cutting relationship with a tool mounted in the spindle 22.

Power for rotating the spindle 22 and for reciprocating the work table 27 is derived from a motor in the base of the column 21 that drives a pulley 31 by means of multiple belts 32, Fig. 2, the pulley being supported at the right side of the machine by means of an inwardly extending hollow sleeve or hub portion 33 that is journaled in a clutch pulley bracket 34 mounted in an opening in the right side of the column 21. Within the hollow hub 33 of the power driven pulley 31 there is rotatably mounted a hollow main driving shaft 35 which may be operatively connected selectively at its outer end to the pulley 31 by means of a friction clutch 36, the shaft being connected at its inner end within the column 21 to a bevel pinion 37 constituting part of a spindle driving transmission train housed within the column 21.

For operating the friction clutch 36, there is provided within the hollow driving shaft 35 a clutch operating rod 38 the outer end of which is arranged to actuate clutch engaging fingers 39 by means of a cone 40, upon axial movement of the rod 38, the clutch and its actuating mechanism together with the pulley 31 and belts 32 being enclosed and protected by a louvered door or cover 41 hinged on the right side of the column. The clutch actuating rod 38 is connected at its inner end within the column, with a grooved clutch operating collar 42 arranged to impart longitudinal movement to the rod. Upon moving the clutch actuating rod 38 to the right, as shown in Fig. 2, by means of the collar 42, the clutch 36 is engaged to drive the main shaft 35. When the rod 38 is moved to the left by the collar, the clutch is disengaged to permit the pulley 31 to turn freely on the shaft 35, and upon further movement of the collar 42 to the left a friction brake mechanism 43 is engaged to quickly stop rotation of the shaft 35 and the spindle driving train in order to quickly stop the tool spindle 22.

The beveled driving pinion 37 at the inner end of the main shaft 35 meshes with two similar beveled pinions 46 and 47 shown in Fig. 3 and that are rotatably mounted on a shaft 48 journaled at right angles to the main shaft 35 in a removable speed changing gear box 49 that is supported within an opening in the left side of the column 21 by means of a cover plate 50 constituting part of the box and fastened to the outside of the column, as shown in Fig. 2. Splined on the shaft 48 between the beveled gears 46 and 47 is a clutch collar 51 that may be moved to engage either of the gears by means of a shifter yoke 52 that is pivotally mounted in the gear box and that may be operated by a plunger 53 extending through the cover plate 50. The plunger 53 is provided on its projecting end with an operating knob 54 whereby it may be moved in or out to shift the clutch collar 51 into engagement with either the gear 46 or the gear 47 thereby constituting a reversing mechanism for controlling the direction of rotation of the shaft 48 and thereby determining the direction of rotation of the spindle 22.

The shaft 48 is provided at one end with a gear 56 (Fig. 3) that meshes with a gear 57 on the end of a splined shaft 58 journaled in the box 49 parallel to the shaft 48, and constituting part of a speed rate changing mechanism 60 that is adjustable to regulate the rate of speed of the spindle 22. As shown, the splined shaft 58 has slidably mounted thereon a gear couplet 61, the gears of which are adapted to be selectively meshed one at a time with gears 62 and 63 respectively fixed on a shaft 64 that is also journaled in the gear box 49, the arrangement constituting a primary rate changing element of the speed changing mechanism 60.

Above the shaft 64 and parallel thereto is arranged another splined shaft 65 that is journaled at its ends in the front and back respectively of the column 21 and that has slidably mounted thereon three gear couplets 66, 67, and 68. The couplets 66 and 67 constitute parts of a secondary element of the speed changing mechanism, the gears of the couplet 66 being disposed to be meshed selectively one at a time with the gear 63 and a gear 69 respectively fixed on the shaft 64, and the gears of the couplet 67 being disposed to be meshed one at a time with gears 71 and 72 respectively fixed on the shaft 64.

The gear couplet 68 on the splined shaft 65 constitutes part of a tertiary rate changing element and comprises a pinion 73 and a relatively large gear wheel 70, the pinion 73 being adapted to mesh with a relatively large gear wheel 74 fixed on the tool spindle 22 and the gear wheel 70 being adapted to mesh with a small gear wheel 83 on the spindle 22, the arrangement being such that only one pair may be in mesh at a time.

The mechanism for shifting the various gear couplets to effect the desired speed of the spindle 22 is similar to that disclosed and claimed in co-pending application S. N. 86,382, filed June 20, 1936, Patent No. 2,182,421, December 5, 1939, and is shown generally in Fig. 2. As there shown, the gear shifting mechanism includes a primary shifting lever 75 carried on a shaft 76 rotatably mounted in the cover plate 50 and having at its inner end a shifting crank member 77 that engages the gear couplet 61 in manner to shift it into operating engagement with either the gear 62 or the gear 63 on the shaft 64, whereby the shaft 64 may be driven at either of two speeds selectively. Mounted concentrically with the primary shifting lever 75 is a secondary shifting lever 78 that is fixed on a sleeve 79 which encircles the shaft 76 and extends through the cover plate 50 and that has on its inner end a plate cam 80. The plate cam 80 is arranged, as more fully described in the previously mentioned co-pending application, to actuate two shifting forks 81 and 82 that function to shift the gear couplets 66 and 67 respectively, the arrangement being such that only one of the gears of the couplets 66 and 67 may be engaged with a cooperating gear on the shaft 64 at any one time. By reason of the four selective gear connections between the shaft 64 and the shaft 65 and the two selective gear connections between the shaft 58 and the shaft 64, the shaft 65 may be driven at any one of eight speeds by suitably positioning the primary shifting crank 75 and the secondary shifting crank 78.

The gear couplet 68 constituting part of the tertiary speed changing device may be shifted by means of a tertiary shifting lever 85, shown in mid-position in Fig. 2, that is rotatably mounted by means of a shaft 86 extending through the cover plate 50 and that has at its inner end a shifting crank 87 engaging a slidably mounted shifting yoke 88 that engages the gear couplet 68. The tertiary crank 85 is provided with a locking pin 89 that may be engaged with either of two positioning holes 90 and 91 Fig. 1 in the cover plate 50 corresponding with opposite horizontal positions assumed by the lever in positioning the gear couplet 68 to engage the pinion 73 with the gear 74 or the gear 70 with the gear 83, respectively.

Inasmuch as the shaft 65 may be rotated at eight different speeds by suitably adjusting the primary and the secondary rate changing devices, the spindle 22 may be operated at eight different speeds in a slow major range when the pinion 73 is in mesh with the gear wheel 74 as shown in Fig. 3, and at eight different speeds in a fast major range when the gear wheel 70 of the couplet 68 is in mesh with the gear wheel 83 on the spindle 22, making a total of sixteen different speeds at which the spindle may be operated. As more fully described in the previously mentioned co-pending application, an indicating dial 92 Fig. 1 is arranged to cooperate with the three gear shifting levers to indicate the rate of speed at which the spindle is being operated as the result of positioning the three levers.

As shown in Figs. 8 and 9, the knee structure 24 for supporting the saddle and table is relatively narrow and is of hollow construction forming a housing enclosing elevating mechanism including an elevating screw 95 connected by bevel gearing 96 to an elevating shaft 97 which extends from the front of the knee and is provided with a squared end 98 for receiving an operating crank. Adjacent to the elevating shaft 97 there is provided a cross traversing shaft 100 that presents a squared end 101 for receiving an operating crank and that is threaded at its inner end to engage a nut 102 fixed on the saddle 26 in such manner that the saddle may be moved toward or from the column by turning the shaft 100 in appropriate direction.

Referring to Fig. 5, the table 27 is ordinarily moved longitudinally relative to the saddle 26 by power means, including two vertically disposed drive shafts 104 and 105 respectively mounted in the column 21 and operatively connected to be driven from the driven pulley 31, as more fully explained in the aforesaid co-pending application. As shown in Fig. 2, a gear 106 rotatably mounted on the pulley bracket 34 is driven by a gear 108 fixed to the sleeve 33 of the driven pulley 31 in manner to be driven directly by the pulley whenever the pulley is operating, the gear 106 being operatively connected to drive the vertical shaft 104, as shown in detail in the previously mentioned co-pending application, in manner to transmit power at constant speed for rapid traverse movement of the table 27. A gear 107 mounted on the main driving shaft 35, which is connected to be driven by the pulley 31 through the clutch 36, operates to drive the vertical shaft 105 whenever the clutch 36 is engaged to drive the spindle 22, and it transmits power to the shaft 105, by mechanism shown in the previously mentioned co-pending application, in a manner to provide power for driving the table 27 at feed rate.

As shown in Fig. 5, the vertical shafts 104 and 105 pass downward through a rearwardly extending bracket 110 carried by the vertically movable knee 24, the shaft 104 being operatively connected by gearing 111 to a horizontally disposed shaft 112 journaled in the bracket 110, the shaft 112 constituting a constant speed driving means for driving the table 27 at rapid traverse rate. The vertical shaft 105 is operatively connected by gearing 113 to drive a horizontal shaft 114 journaled in the bracket 110, the shaft 114 constituting a constant speed driving means for driving the table 27 at a selected feed rate.

Inasmuch as it is not necessary to provide power driving connections for moving the knee vertically or for moving the saddle horizontally relative to the knee, all of the mechanism for power movement of the table 27 is arranged to be carried directly by the saddle 26 in manner to be directly connected to the table 27 and to be movable bodily with the saddle toward or from the column, the constant speed rapid traverse driving shaft 112 and the constant speed feed rate driving shaft 114 being arranged to have sliding connection with transmission mechanism in the saddle.

In order to accomodate transmission and control mechanism and to provide ample capacity for lubricating and actuating liquid, the saddle 26 is made hollow and is so shaped as to entirely encircle the knee 24. As best shown in Fig. 4 the saddle 26 is of generally annular configuration and comprises essentially a relatively thin top cross piece or saddle plate 117 that is slidably mounted on the top of the knee 24 and that is connected at each end with the ends of a U-shaped hollow reinforcing member or yoke 118 conforming to but spaced from the sides and bottom of the knee 24, the arrangement being such that the table 27 is supported at minimum height above the knee thereby improving the rigidity of the structure. The U-shaped hollow member 118 provides at the right side of the knee 24 a compartment 119 for driving mechanism and at the left side of the knee 24 a compartment 120 for control mechanism, the lower portion connecting the compartment 119 and 120 constituting a reservoir 121 of large capacity for lubricating oil that also serves as operating liquid for the hydraulic control mechanism. In order that the liquid in the reservoir 121 may be cooled, the U-shaped member 118 is provided on its sides and bottom with circumferentially disposed cooling fins 122 that function also as reinforcing ribs for stiffening the saddle structure.

As shown in Fig. 5, power for moving the table at feed rate is transmitted from the horizontal constant speed feed shaft 114 to a co-axially disposed shaft 124 journaled in the transmission compartment 119 of the saddle and having telescopic splined connection with the shaft 114 to permit relative longitudinal movement there-between. At its forward end the shaft 124 is provided with a spur pinion 125 meshing with a gear 126 on a horizontal shaft 127 constituting part of a rate changing mechanism 128 for adjusting the rate of feed at which the table may be driven by the constant speed horizontal shaft 114. As shown in Figs. 4 and 5 the shaft 127 is provided at its forward end with a pinion 129 that drives a pick-off gear 130 rotatably mounted on a stud 131 and meshing with another pick-off gear 132 fastened upon the end of a shaft 133. The pick-off gears 130 and 132 are made accessible by opening a door 134 in the front of the gear compartment 119 in order that they may be removed readily and interchanged or replaced by other pick-off gears of different ratio for adjusting the feed rate of the table.

The shaft 133 is provided at its inner end with a pinion 135 that meshes with a feed rate gear 136 on an overrunning clutch mechanism 137 through which power is transmitted to a table driving gear 138 meshing with a gear 139 on a short shaft 140 journaled in the upper part of the saddle, as shown in the horizontal sectional view, Fig. 7. The shaft 140 is provided at its forward end with a bevel pinion 141 that meshes with two similar bevel clutch pinions 142 and 143 rotatably mounted on a sleeve 144 as shown in Fig. 6. The sleeve 144 is splined on a table driving screw 145 and is retained in the saddle against longitudinal movement by abutment members 146 and 147 respectively. Slidably splined on the sleeve 144 between the clutch pinions 142 and 143 is a clutch spool 148 having clutch teeth at its ends arranged to mesh selectively with complementary clutch teeth of the pinions 142 and 143 in such manner that the sleeve 144 may be rotated thereby in either direction or it may be disconnected entirely from the driving pinions upon moving the clutch spool to its central neutral position.

The table driving screw 145 is rotatably mounted at its ends in boxes depending from the ends of the table 27 and it has threaded engagement with a nut mechanism 151 stationarily mounted in the saddle, whereby rotation of the feeding screw 145 within the nut 151 causes the screw and the table 27 to move longitudinally relative to the saddle 26. The screw 145 is provided with a squared end 152 at the left end of the table to which a crank may be applied for moving the table manually.

In order to avoid the occurrence of lost motion between the feed screw 145 and the stationary nut 151, to enable the machine to be used for climb cutting without chatter or jerking, the nut 151 is arranged to be adjusted to tightly engage the screw 145. As shown in Fig. 6, the nut 151 comprises complementary half nuts 154 and 155 that are divided longitudinally along a horizontal axial plane, the lower half nut 154 being solidly mounted on the top of the saddle structure and having end lugs 156 and 157, respectively disposed to engage the saddle in manner to prevent endwise movement thereof relative to the saddle. The upper half nut 155 is slidably mounted for limited longitudinal movement relative to the lower half nut 154 and is engaged at its left end by a threaded adjusting collar 158 that may be turned to adjust the longitudinal position of the upper half nut relative to the lower half nut. When the upper half nut is forced to the right, as seen in Fig. 6, the threads thereof may be caused to tightly engage one side of the threads of the screw 145 and to force the other side of the threads of the screw against the threads of the lower half nut 154, whereby the screw 145 is rigidly held in the stationary nut 151 and longitudinal lost motion is avoided.

A locking screw 159 is provided for locking the adjusting collar 158 in adjusted position.

The table 27 is provided at its rear edge with a centrally located coolant drain opening 162, shown in Fig. 5, the drain discharging into a coolant collecting trough 166 in the saddle 26 which communicates at its ends with catch pans or pockets 163 and 164 disposed respectively at the sides of the saddle 26 as shown in Fig. 6. The pans are arranged to catch coolant which may drip from the table, an extensible coolant discharge pipe 165 being provided to convey coolant from each pan individually to a coolant reservoir in the base of the machine, as shown in Fig. 1.

Power for moving the table 27 at rapid traverse rate is transmitted from the horizontal constant speed shaft 112 to a gear 167 rotatably mounted within the saddle and having splined connection with the end of the shaft 112 to permit relative longitudinal movement therebetween. The gear 167 meshes with a rapid traverse driving gear 168 that is mounted on a rapid traverse clutch mechanism 169 which is operative to selectively effect driving connection between the gear 168 and the table driving gear 138, the overrunning clutch mechanism 137 permitting the gear 138 to turn faster than the feed rate driving gear 136, whereby the gear 138 will drive the gear 139 and the bevel pinion 141 in manner to move the table at rapid traverse rate.

For controlling the direction of movement of the table, means are provided to move the clutch spool 148 to engage it with either of the clutch pinions 142 or 143. As shown in Fig. 5, there is provided a shifting yoke or reversing fork 171 which engages a groove in the clutch spool 148 and is slidably mounted for longitudinal movement in the saddle an opening 172 being provided therein for receiving a shaft. At its forward end, the reversing fork 171 is provided with rack teeth 173 that are engaged by the teeth of a gear segment 174 formed on the inner end of a hollow control shaft 175 that extends at the front of the saddle and is provided at its outer end with a feed control lever 176. When the feed control lever 176 is in vertical central position, as shown in Fig. 4, the clutch spool 148 is in its central or neutral position and out of engagement with both the clutch pinion 142 and the clutch pinion 143 and the table driving means is disconnected. To cause the table to be driven to the right, the feed lever 176 is moved to the right from its vertical position to engage the clutch spool 148 with the clutch pinion 143, and to cause the table to move to the left, the lever is moved to the left to engage the clutch spool with the clutch pinion 142.

In order that the clutch spool 148 may be moved by automatic control means to effect automatic stopping or reversing of the table, there is provided a slidably mounted reversing control rod 177 extending horizontally across the saddle parallel with the feed screw 145 and connected to the reversing fork 171, as shown in Fig. 7. The control rod 177 is provided at its right end with three detent notches disposed to be engaged by a spring pressed plunger 178 to retain the reversing fork in its neutral position or in either one of its table driving positions.

At the middle of the saddle, the control rod 177 is provided with a rack 181 having teeth engaging the teeth of a gear segment 182 on a rotatably mounted control sleeve 183, Fig. 10, that encircles and is slidably keyed to a vertically movable control plunger or tripping post 184. The rotatably mounted sleeve 183 is provided at its upper end with tripping abutments 185 that extend to the right and to the left thereof at the top of the saddle 26, as shown in Fig. 7 in such manner that when the clutch spool 148 is engaged with one of the clutch pinions to drive the table, the tripping abutments 185 will be so turned from the neutral position shown in Fig. 7 that one of them will be positioned near the forward edge of the table 27 in the path of tripping means such as a stop dog 186 adjustably fixed on the front of the table. When the table is moved to the position in which the stop dog 186 engages the abutments 185, the control sleeve 183 will be turned to neutral position thereby disengaging the clutch 148 and stopping the table. After the table has been stopped by the stop dog 186, the feed lever 176 may be moved in direction to engage the clutch 148 with the other clutch pinion in order to move the table in the opposite direction. A similar but oppositely shaped stop dog may be provided at the other end of the table to stop it automatically in predetermined position when it is being moved in the other direction.

For effecting automatic reversal of the direction of table travel and for controlling the engagement of the rapid traverse clutch 169 to drive the table at rapid traverse rate there is provided a hydraulic control mechanism most of which is housed in the control compartment 120 of the saddle 26. As shown in Fig. 7 the table reversing control rod 177 is provided at its left end with a piston 187 that operates in a cylinder 188 formed in the saddle and so arranged that fluid pressure may be applied to either side of the piston to shift the rod 177 either to the right or to the left as may be desired. The mechanism for hydraulically actuating the rapid traverse clutch 169 to operatively connect the rapid traverse driving shaft 122 with the table driving gear train, is shown in longitudinal section, somewhat diagrammatically, in the upper right hand corner of Fig. 13. As there shown, the feed driving gear 136 is operatively connected by means of an overload release clutch 191 with the overrunning clutch 137 that is arranged to drive the shaft 192 to which the table driving gear 138 is keyed, thereby driving the table at the selected feed rate when the control mechanism is arranged for table drive at feed rate. The rapid traverse clutch 169 is arranged to selectively connect the rapid traverse driving gear 168 to the shaft 192 to thereby enable the shaft 192 to be turned within the overrunning clutch 137 faster than the feed driving gear 136 whenever the clutch 169 is engaged.

For engaging the rapid traverse clutch 169 there is provided a hydraulic cylinder and piston mechanism 193 that is arranged to exert force against the plates of the clutch 169 to couple the gear 168 to the shaft 192 when pressure is admitted to the cylinder through a passageway 194 extending longitudinally through shaft 192 to one end thereof. When pressure is released from the passageway 194 a spring 195 moves the piston 193 in direction to release the plates of the clutch 169.

In order to prevent the table 27 from coasting or continuing to move at a rapid rate after the rapid traverse clutch 169 has been released, means are provided for rapidly retarding the shaft 192 to the speed of the feed rate driving gear 136. For this purpose there is provided a retarding clutch or brake 197 that is disposed to be engaged by the piston 193, moving under the influence of the spring 195, to frictionally couple the feed rate driving gear 136 with the shaft 192, and thereby quickly reducing the speed of the shaft to that of the driving gear 136, whereupon driving action at feed rate will be promptly resumed through the overrunning clutch 137.

The hydraulic control mechanism for actuating the rapid traverse clutch 169 includes a rapid traverse control valve 201, shown at the left in Figs. 4 and 13, from which a conduit 202 extends to a cap 203 at the end of the shaft 192, the cap 203 providing a rotatable connection with the passage 194 in the shaft 192. The rapid traverse valve 201 comprises a plunger 204 arranged for vertical movement within a valve body or sleeve 205 provided with valve ports, the conduit 202 being connected to a port 206. When the valve plunger 204 is raised from the position shown in the drawings a land thereof uncovers a pressure port 207 in manner to effect communication with the port 206, whereupon liquid under pressure from a conduit 208 may flow through the port 207, the port 206, conduit 202, cap 203 and the passageway 194 to engage the rapid traverse clutch. When the valve stem 204 is moved down to the position shown in the drawings, it closes the port 207 thus cutting off the pressure source and at the same time opens another port 209 beneath the port 206 in manner to connect conduit 202 through the port 206 and the port 209 to a drain opening 210, whereby liquid from the cylinder 193 of the rapid traverse clutch may be forced by the spring 195 out through the passage 194 and the conduit 202 to the drain opening 210, thereby permitting the rapid traverse clutch to be released and the retarding brake 197 to be engaged.

For moving the valve plunger 204 up or down to control the rapid traverse clutch, there is provided at the front of the saddle a rocking control shaft 212, shown in Fig. 7, extending parallel with the control rod 177 and having at its left end an arm 213 provided with a rounded end engaging a slot 214 in the upper end of the valve plunger 204 whereby the plunger may be moved vertically upon rocking the shaft 212. As shown in Fig. 11, the arm 213 is provided with two detents that may be engaged by a spring pressed plunger 215 to retain the valve plunger 204 in either its upper or its lower position. As shown in Figs. 5 and 7, the rocking shaft 212 is provided at its right end with a crank arm 216 having a rounded end engaging a slot 217 in a horizontally disposed control rod 218 that is slidably mounted within the hollow control shaft 175. At its outer end the rod 218 is provided with an opening 219 that is engaged by the lower end of the table control lever 176, the lever being so mounted on the hollow shaft 175 as to permit tilting movement thereof toward and from the table in manner to move the control rod 218 in or out to thereby turn the rocking shaft 212 for moving the rapid traverse valve plunger 204 up or down, the arrangement being such that when the lever 176 is pulled away from the table, the valve plunger 204 is moved upward and the rapid traverse clutch 169 is engaged.

For effecting automatic operation of the rapid traverse clutch valve in response to movement of the table 27, the rocking shaft 212 is provided at the middle of the saddle with an arm 221 having a rounded end engaging a slot 222 in the vertically movable tripping post 184, as shown in Fig. 10. The tripping post 184 is arranged to be moved upwardly by an adjustably mounted tripping dog 223 shown in Fig. 4 on the front of the table, in manner to move the valve plunger 204 upward to engage the rapid traverse clutch. For disengaging the rapid traverse clutch, a tripping dog 224 is adjustably fixed on the table in position to engage the tripping post 184 in manner to move it downward, thereby moving the valve plunger 204 down to the feed position, as shown in the drawings.

In order that the main spindle clutch 36 may be operated either manually or automatically by means of control apparatus carried by the saddle, hydraulic actuating mechanism is provided for shifting the clutch control rod 38. As shown in Fig. 2, the clutch shifting collar 42 is engaged by a shifting fork 226 that is slidably mounted on a guide rod 227 and that is attached to an actuating or shifting rod 228 slidably mounted for horizontal movement in a guide block 229. The shifting rod 228 is provided at its left end with a piston 230 that operates in a cylinder 231 mounted on the cover 50 of the gear box, as shown in Fig. 2. Pressure for actuating the piston 230 within the cylinder 231 is provided by a primary pump 232 shown in Fig. 2, and indicated diagrammatically in Fig. 13. The pump 232 is arranged in the usual manner to pump the lubricating oil for lubricating the mechanism within the column 21 of the machine and it is connected by means of a conduit 233 to a pilot valve 234 associated with the cylinder 231 and arranged to control the operation of the hydraulic actuating mechanism for the main clutch 36.

For controlling the actuation of the spindle clutch 36 by means of the pilot valve 234 there is provided in the saddle of the machine a spindle controlling valve 236 (Fig. 11) that is arranged to be actuated manually by means of a spindle controlling lever 237 and that is operatively connected to the pilot valve 234 by means of a control system including a single closed fluid passageway or hydraulic lead constituted by a flexible conduit 238 extending from the saddle 26 to the column 21, as shown in Fig. 1.

As shown in Fig. 11, the spindle controlling valve 236 includes a valve body 240 mounted on the end of an operating shaft 241 that is connected by gearing 242 to a shaft 243 that carries the operating lever 237, whereby movement of the lever 237 from side to side causes the valve body 240 to turn within a valve casing 244, a detent mechanism 245 being provided for retaining the lever 237 in either one of its two operating positions.

The valve body 240 is shown diagrammatically in developed form in Fig. 13 in position to permit control of the spindle automatically, the valve ports being shown in starting or running position and indicated by the broken dotted portions in stop position at the right of the running position.

Operating liquid under pressure for actuating the hydraulic control mechanism in the saddle 26 is derived from a secondary pump 247 shown in Fig. 5 and that is arranged to pump liquid from the reservoir 121 in the bottom of the saddle, as shown diagrammatically in Fig. 13. From the pump 247 the liquid flows through a conduit 248 to a port 249 in the valve sleeve 244 which communicates with a groove 250 in the valve body 240 that in turn communicates with a port 251 to which is connected a conduit 252. The conduit 252 connects to a port 253 in a table reverse valve 254 disposed at the right of the rapid traverse valve 201 and shown in neutral position with the port 253 communicating with a port 255 from which the pressure conduit 208 leads to the port 207 of the rapid traverse control valve 201. From the port 207 of the valve 201 a conduit 256 leads to a low pressure relief valve 257 that is ordinarily adjusted to open at a pressure of approximately 10 70 pounds to the square inch in the conduit 256. From the low pressure conduit 256 a conduit 258 leads to a circumferential groove 259 in the valve body 240 that has a branch groove 260 which communicates with a port 261 when the valve is in the running position shown in Fig. 13. From the port 261 a conduit 262 leads to a port 263 of the rapid traverse valve 201 which is shown in communication with a port 264 that connects with the flexible conduit 238 extending from the movable saddle to the pilot valve 234 on the column of the machine.

With the spindle control valve 236 in the position shown in Fig. 13, the operating liquid from the pump 247 exerts pressure through the valve connections just described and through the single flexible conduit 238 to the pilot valve 234 in manner to exert force upon the right end of a valve plunger 267 forcing it to the left against the resistance of a spring 268 which functions continuously to urge the plunger to the right as shown in Fig. 13. When the pilot valve plunger 267 is in the left position, liquid from the primary pump 232 in the column enters the pilot valve from the conduit 233 through a port 269 that then communicates with a port 270 from which the liquid passes through a conduit 271 to the left end of the clutch operating power cylinder 231, moving the piston 230 to the right as shown in Figs. 2 and 13, to engage the main clutch 36 for driving the spindle 22, the liquid from the right end of the piston draining through the valve 234. When the piston 230 has been moved to its extreme right position, a port 272 in the wall of the cylinder is uncovered to permit the operating liquid to enter a conduit 273 from which it passes through a port 274 of the pilot valve to a conduit 275 that is connected to the lubricating system for lubricating the mechanism in the column of the machine.

When the spindle control lever 237 is moved to its stop position to stop the spindle, the spindle control valve body 240 is moved in manner to position the ports as shown in dotted lines in Fig. 13, whereupon the port 261 is disconnected from the actuating pressure exerted through the groove 259 and the groove 260, and is connected with a groove 277 which is provided with a drain opening 278. This results in relieving the fluid pressure from the pilot valve 234, whereupon the plunger 267 thereof moves to the right under the influence of the spring 268 and forces the operating liquid back through the flexible conduit 238, through the valve ports 264 and 263 and the conduit 262, to the port 261 from which it then escapes through the groove 277 and the drain opening 278. With the spindle control valve thus in spindle stop position, the port 249 is brought into communication with a branch of the low pressure groove 259 in order that low pressure liquid may be available in the conduits 248 and 256 for actuating the rapid traverse clutch 169.

When the pilot valve body 267 is moved to the right by the spring 268, the passageway between the ports 269 and 270 is closed thereby cutting off the supply of operating pressure from the pump 232 to the left end of the clutch operating cylinder 231. At the same time a passageway is opened to place the port 269 in communication with a port 279 from which the liquid passes through a conduit 280 to the right end of the clutch actuating cylinder 231, whereupon the piston 230 is moved to the left to disengage the spindle clutch 36. When the piston 230 moves to its left position, the port 272 is again uncovered and the liquid from the pump 232 flows through the conduit 273 and the port 274 to the lubricating supply conduit 275. The liquid in the left end of the cylinder 231 is forced out through the conduit 271 into the port 270 that has been placed in communication with a port 281 from which the liquid escapes through a drain 282.

In order to effect automatic reversal of the direction of movement of the table 27, there is provided a trip mechanism including two trip plungers 285 and 286 shown in Fig. 4, that extend upwardly from the top of the saddle 26 into the path of a reversing dog 287 adjustably positioned on the front of the table, the plungers 285 and 286 being operatively connected to actuate the reversing valve 254. As shown in Figs. 4 and 13, the reversing valve 254 comprises a plunger 288 that is slidably mounted within a valve sleeve 289 in manner to be moved either up or down from its neutral or central position, a spring 290 being provided for resiliently holding the plunger 288 in central position as shown in the drawings.

The valve plunger 288 is provided in its upper end with a slot 291 that engages one end of a rocker arm 292 pivotally mounted in the saddle, the other end of the arm engaging a slot 293 in the trip plunger 285. The trip plunger 285 is provided at its other side with a slot 294 engaging one end of a yoke-shaped rocker arm 295 that engages at its other end in a slot 296 in the trip plunger 286, the yoke 295 being shaped at its mid-portion to encircle the control sleeve 183 in spaced relation thereto and being pivoted midway between its ends in the saddle. When the valve plunger 288 is in its central or neutral position as shown in Fig. 4 the trip plungers 285 and 286 extend equally above the top of the saddle.

When the table 27 in travelling from right to left as shown in Fig. 4, moves to a position in which the reversing dog 287 engages the trip plunger 286 in manner to force it downward, the rocker arm 295 moves the other trip plunger 285 upward and the rocker arm 292 moves the valve plunger 288 downward within the valve sleeve 289. When the valve plunger 288 is moved downward, a land 298 thereof closes a passageway between the port 253 and the port 255 thereby stopping off the flow of fluid from the pump 247 to the low pressure relief valve 257, whereupon the pressure delivered by the pump through the conduit 248 the valve 240 and the conduit 252 will build up to a pressure sufficiently high to be released through a high pressure relief valve 299 that is ordinarily set at a pressure of approximately 300 pounds to the square inch. The surplus liquid escaping through the relief valve 299 passes into the conduit 256 from which it may flow through the low pressure relief valve 257, thereby maintaining liquid at low pressure in the conduit 256 for actuating the rapid traverse clutch and in the conduit 258, the groove 259, port 261 and the conduit 262 for acting upon the pilot valve plunger 267 to maintain the main clutch 36 in engaged position.

When the valve plunger 288 moves downwardly a sufficient distance to register a groove 301 thereof with a valve port 302, to which the conduit 252 is connected, liquid at high pressure will flow from the conduit 252 through an opening 303 extending longitudinally through the plunger 288 from the groove 301 to a cylinder 304 formed at the upper end of the valve sleeve 289 in manner to exert pressure on the upper end of a piston portion 305 of the valve plunger to quickly force the plunger downward to its lowest position.

When the plunger 288 arrives at its lowest position the port 302, connected with the high pressure supply conduit 252, is also placed in communication with a port 306 connecting with a conduit 307 that conveys the high pressure liquid to the left end of the reversing cylinder 188 whereupon the reversing piston 187 is moved to the right to move the reversing clutch 148 into engagement with the table driving bevel pinion 143, thereby reversing the direction of travel of the table to cause it to move from left to right. Liquid in the right end of the cylinder 188 is forced out through a conduit 308 that connects with a port 309 in the valve sleeve 289 from which the liquid flows through the valve to a port 310 and escapes through a drain 311.

In order that the movement of the table in reverse direction may be caused to take place at rapid traverse rate, the reversing cylinder 188 is provided with a centrally disposed port 313 which is uncovered when the piston 187 arrives at the right end of the cylinder whereupon the liquid under high pressure flowing through the conduit 307 and the cylinder 188 passes through a conduit 314 to a port 315 in the upper end of the valve sleeve 289 and thence by a conduit 316, also connected directly to the port 315 to a port 317 in the sleeve 205 in the rapid traverse valve 201. As shown, the port 317 communicates with a cylinder 318 in the upper part of the rapid traverse valve in manner to apply the high pressure below a piston 319 formed on the valve stem 204, whereupon the stem 204 is quickly moved upward to rapid traverse position, thereby connecting the low pressure supply conduit 256 to the rapid traverse clutch actuating conduit 202, as previously explained.

When the rapid traverse plunger 204 arrives at its upper or rapid traverse position, the piston 319 thereof uncovers a port 320 that communicates through a conduit 321 directly with a port 322 in the cylinder 304 at the top of the reversing valve 254. At the same time a port 323 in the valve plunger 204 is brought into communication with the cylinder 318 to permit the liquid to flow through a longitudinal passageway 324 to the lower end of the valve 201. From the longitudinal passageway 324 the liquid escapes through another port 323 in the plunger and enters a port 325 that is directly connected by a conduit 326 with a port 327 in the lower end of the reversing valve sleeve 289, in manner to exert pressure upwardly on a piston 328 formed on the plunger 288. The upward force exerted on the piston 328 quickly counter-balances the downward force exerted on the piston 305 in such manner that the reversing plunger 288 is permitted to move promptly to its neutral position under the influence of the spring 290, the pressure on the pistons 328 and 305 being subsequently relieved through bleeder holes in the conduits 321 and 326. When the plunger 288 moves to neutral position, the pressure to the reversing cylinder 188 is cut off by reason of the fact that the port 302 is closed, the pressure in the cylinder being relieved through the conduit 314 which is then connected to a drain port just below the port 315 and through the conduits 307 and 308 which connect through ports 306 and 309 respectively to drain ports as shown. By connecting both ends of the cylinder 188 to drain ports in this manner, the piston 187 is freed from hydraulic resistance to permit the reversing mechanism to be actuated mechanically without interference.

The rapid traverse plunger 204 remains in its upper position by reason of the retaining detent mechanism 215 shown in Fig. 11 and as pressure upon it has been relieved, it likewise may be moved by the mechanical actuating mechanism without resistance from the hydraulic system. With the valve piston 288 in its neutral position and the port 302 from the conduit 252 closed, the port 253 is again placed in communication with the port 255 whereupon the high pressure liquid in the conduit 252 escapes through the ports 253 and 255 into the conduit 208 and thence through the port 207 to the low pressure conduit 256 from which it escaped through the low pressure relief valve 257, thereby relieving the pump 247 from the necessity of providing further liquid at high pressure.

To prevent marring of a work piece by a cutting tool in the spindle 22 when the table 27 is reversed at rapid traverse rate, it is desirable that the spindle be brought to a stop simultaneously with automatic reversal of the direction of table movement. For this purpose the lower part of the rapid traverse valve plunger 204 is provided with a land 331 that closes the port 263 when the valve is moved to rapid traverse position thereby cutting off the supply of low pressure liquid from the conduit 262 to the flexible conduit 238. At the same time a land 332 of the valve piston 204 opens a port 333 in manner to permit the liquid in the spindle clutch pilot valve 234 to flow back through the flexible conduit 238, the ports 264 and 333 into a conduit 334 that connects with a port 335 of the spindle control valve 236 which in turn communicates with the groove 277 of the valve body 240 in manner to permit the liquid to discharge through the drain 278. The spring 268 of the pilot valve 234 is then free to move the valve piston 267 to the right in manner to connect the primary pump 232 to the right end of the clutch operating cylinder 231, as previously explained, thereby disengaging the main clutch 36 and applying the spindle brake 43 to stop the spindle.

After the table 27 has been moved at rapid traverse rate to the right the desired distance, the tripping post 184 is engaged by a trip dog similar to the dog 224 in manner to move it downward thereby moving the rapid traverse valve plunger 204 down to the feed position, whereupon the table is quickly retarded to feed rate by action of the retarding brake 197 as previously described, and the table will then continue to the right at the selected feed rate. When the plunger 204 moves down to the feed position, the land 332 closes the port 33 and the land 331 opens the port 263, thereby reestablishing pressure in the flexible conduit 238 to the pilot valve 234 and reengaging the clutch 36 to start the spindle.

To effect automatic reversal into movement at rapid traverse rate in the opposite direction, there is provided another reversing dog similar to the dog 287 at the other end of the table which is positioned to engage the trip plunger 285, moving it downward and turning the rocking arm 292 in direction to raise the reversing valve plunger 288. When the valve plunger 288 moves upward the low pressure port 253 is closed by a land 336 of the plunger, Fig. 13, and pressure in the conduit 252 builds up as previously described. Upon further upward movement of the plunger, high pressure from the port 302 enters a groove 337 connecting with a passageway 338 through the plunger to the lower end thereof from which the liquid escapes into the chamber 327 and exerts pressure upon the piston 328 to quickly move the plunger 288 upward to reverse position, the liquid in the cylinder 304 at the top of the valve escaping meanwhile through the bleeder hole in the passageway 321 and through the passageway 303. The high pressure liquid then flows from the port 302 to the port 309 and thence through the conduit 308 to the right side of the reversing piston 187 moving it to the left to engage the reversing clutch 148 with the clutch pinion 142 for driving the table from right to left. The liquid in the left end of the cylinder 188 is forced out through the conduit 307, and port 306 to a drain port above the port 306 that is uncovered by upward movement of the land 336.

When the piston 187 arrives at its left position it uncovers the port 313 permitting the high pressure liquid to pass through the conduit 314, the port 315, the conduit 316, and the port 317, to lift the piston 319 of the rapid traverse valve stem 204 thereby effecting engagement of the rapid traverse clutch 169 to cause the reverse movement to take place at rapid traverse rate. The rapid traverse valve plunger 204 in moving upward closes the port 263 and opens the port 33 to permit liquid to escape from the pilot valve 234 through the flexible conduit 238 thereby stopping the spindle 22 as previously explained. It also opens the ports 320 and 323 to establish the neutralizing circuit permitting the reverse valve plunger 288 to return to neutral position which results in relieving pressure from both ends of the reversing cylinder 188.

In order that the reversing piston 187 may be relieved of the necessity for exerting excessive force in disengaging the reversing clutch 148 against the frictional resistance thereof when under load, it is desirable that a stop dog 186 be positioned in front of the reversing dog 287, as shown at the right end of the table in Fig. 4, whereby the stop dog will engage the abutment 185 of the control sleeve to positively move the clutch 148 nearly to its disengaged position before the reversing plunger 286 is depressed.

If it is desired to operate the machine without stopping the spindle when the table is automatically reversed at rapid traverse rate, the valve body 240 of the spindle control valve 236 may be turned independently of the spindle controlling lever 237 within the valve sleeve 244 to a second operating position that is indicated diagrammatically in Fig. 12. Turning of the valve body 240 to its other operating position is accomplished by withdrawing a locking pin 340, shown in Figs. 6 and 11, that is carried on an arm 341 keyed to the shaft 243, from a positioning hole 342 in the hub of the lever 237 and moving it to a second positioning hole 343, thereby turning the valve body 240 relative to the operating lever 237. In Fig. 12 the valve body 240 is shown in the second operating position with the ports of the sleeve 244 indicated in solid lnes in the spindle starting or running position and in dotted lines in the spindle stop position. In the spindle stop position both the port 261 and the port 335 (shown dotted) are connected with the groove 277 of the valve body 240 in such manner that liquid from the flexible conduit 238 may escape through either the port 263 or the port 333 of the rapid traverse valve, through the conduit 262 or the conduit 334 and thence through the groove 277 to the drain opening 278. When the valve body 240 is moved to the spindle running position, both the port 261 and the port 335 (shown in full lines) are connected with a groove 345 that connects with the low pressure groove 259, whereby liquid at low pressure is applied to both the conduit 262 and the conduit 334 and may pass through either the port 263 or the port 333 into the port 264 and thence through the flexible conduit 238 to engage the main clutch 36, regardless of whether the rapid traverse plunger 204 is in the upper or the lower position. Consequently the spindle will continue to operate when reversal takes place at rapid traverse rate and it will be under the control of the manually operable spindle control lever 237 exclusively.

When the spindle control lever 237 is moved manually to its stop position to stop rotation of the spindle, the control valve 236 functions to disconnect the source of fluid pressure from the reversing valve 254, thereby rendering inoperative the table reversing control mechanism and preventing unintentional operation of the work table through accidental actuation of the trip mechanism. As may be seen in Figs. 12 and 13, when the valve body 240 is turned to spindle stop position, the groove 250 is moved out of register with the pressure port 249 to cut off the supply of fluid pressure to the conduit 252. This prevents the flow of liquid through the reversing valve 254 and the table reversing cylinder 188 to the rapid traverse valve actuating cylinder 318 and obviates the possibility of the rapid traverse valve being shifted by accidental depression of a reversing plunger which might otherwise cause unexpected movement of the table at rapid traverse rate.

From the foregoing explanation of the construction and operation of a preferred embodiment of the invention, it is apparent that the invention has provided an improved machine tool of simple and rugged construction that is versatile and convenient to operate and that embodies control features of advanced design.

Although only one embodiment of the invention has been shown and described, it will be apparent to those skilled in the art to which this invention relates that various modifications in the manner of constructing the machine may be effected without departing from the spirit and scope of the invention as defined in the subjoined claims.

What is claimed is:

1. In a milling machine the combination of a base, a column upstanding therefrom, a knee guided on said column for vertical reciprocation and including an outstanding horizontal slideway portion, a saddle having vertical side wall portions respectively adjacent opposite lateral edges of said slideway, a top portion connecting said side walls above said slideway and having slide surfaces engaging said slideway to guide said saddle for horizontal reciprocatory movement, and a bottom portion underneath said slideway and connecting said side walls at a point between spaced vertical planes respectively coinciding with the opposite ends of the slideway, a table guided on said saddle top portion for horizontal reciprocation in a path transverse to the direction of saddle movement, a table transmission including an element carried by said saddle and shiftable for altering the transmission effect, a fluid operable shifter for said element, a fluid reservoir within said bottom saddle portion, and a pump receiving fluid from said reservoir and connected for operation of said shifter, said reservoir providing a wall portion having exteriorly spaced projections for radiation of heat from the fluid within the reservoir and forming an exterior wall portion of said saddle.

2. In a machine tool the combination of a tool support and a work support, a transmission for movement of one of said supports including a member shiftable to different positions respectively for different transmission effects, a fluid operable shifter for said member, a first pressure fluid supply source alternatively connectible for shifter operation to effect the one or the other of said member positions, a first valve means shiftable for controlling the connection of said first source and shifter, means continuously urging said first valve means to a position effecting one connection of said first source and shifter, a second pressure fluid supply source connectible for shifting said valve means to a position effecting another connection of the first mentioned source and shifter, and a second shiftable valve means controlling the connection of said second source with said first valve means.

3. In a machine tool the combination of a rotatable tool support and a relatively bodily movable support, a transmission for one of said supports including a shiftable transmission member, a shifter for said member, a first pump alternatively connectible for operation of said shifter in opposite directions, a first shiftable valve means controlling the connection of said first pump, spring means continuously urging said first valve means in a direction to effect the one connection of said first pump, a second pump connectible for shifting said first valve means in the other direction and a second valve means controlling the connection of said second pump.

4. In a machine tool the combination of a tool support and a work support, a plurality of transmissions respectively for the different supports and each including a shiftable transmission member, a plurality of fluid operable shifters respectively for the different members, a plurality of pressure fluid supply sources respectively connectible with the different shifters, a plurality of valve means respectively controlling the shifter connection of the different sources, means continuously urging one of said valve means in one direction to effect one connection of the associated supply source and shifter, and means for shifting the last mentioned valve means in the other direction including a channel connection between said last mentioned valve means and the other supply source, and a third valve means shiftable for alternatively rendering said channel connection effective or ineffective.

5. In a machine tool the combination of a tool support and a work support, a plurality of transmissions respectively for the different supports and each including a shiftable member, a plurality of fluid operable shifters respectively for the different members, means for shifting one of said support member shifters alternatively in opposite directions including a first pressure fluid supply source connectible therewith and a first shiftable valve means controlling the connection of said first source, means for shifting the other of said support member shifters alternatively in opposite directions including a second pressure fluid supply source and a second shiftable valve means controlling the connection of said second source, means continuously urging said first valve means in one direction, and means for shifting said first valve means in the other direction including a channel connection from said second supply source and shiftable valve means controlling said channel connection.

6. In a milling machine, a column, a tool supporting spindle rotatably mounted in said column, power driving means in said column, a hydraulically operated clutch disposed to selectively connect said driving means to said spindle for rotating it, a primary pump mounted in said column for providing fluid pressure to actuate said clutch, a hydraulically actuated pilot valve mounted in said column and arranged to control the operation of said clutch by said fluid pressure from said primary pump, a knee projecting from and slidably mounted on said column, a hollow saddle structure shaped to conform with and to entirely encircle said projecting knee and slidably mounted thereon the lower part of said hollow structure serving as a reservoir of large capacity for operating liquid, a work supporting table slidably mounted on said saddle, operating mechanism mounted within said hollow saddle structure and connected to actuate said table, means disposed to transmit power from said driving means in said column to said operating mechanism in said saddle, hydraulic control mechanism mounted within said hollow saddle structure and operatively connected to control said operating mechanism therein, a secondary pump carried by said saddle and operative to pump liquid from said reservoir for actuating said hydraulic control mechanism and for actuating said pilot valve in said column, a control valve mounted in said saddle and disposed to control the flow of liquid from said secondary pump to said pilot valve and a single flexible conduit operatively connecting said control valve in said saddle to said pilot valve in said column for controlling said hydraulically operated clutch from said saddle.

7. In a hydraulic control system for a mechanism, the combination with a primary source of fluid pressure for actuating said mechanism, of a pilot valve connected to control the flow of fluid from said primary source to thereby control the operation of said mechanism said pilot valve being resiliently urged to one position of operation and movable to another position of operation by fluid pressure, a secondary source of fluid pressure, a single closed fluid passageway operatively connecting said secondary source of fluid pressure to said pilot valve for actuating it, and a control valve disposed to control the flow of pressure fluid through said passageway, whereby said pilot valve may be selectively moved to either operating position in response to the pressure impressed thereon by said secondary source through said passageway to thereby effect control of said mechanism.

8. In a machine having relatively movable parts and having mechanism associated with one of said parts, a hydraulic control system for said mechanism including a primary source of fluid pressure for operating said mechanism, a pilot valve connected to control the flow of fluid from said primary source to said mechanism to thereby control the operation of said mechanism said pilot valve being resiliently urged to one position of operation and movable to another position of operation by fluid pressure means, a secondary source of fluid pressure carried by another of said relatively movable parts and operative to actuate said pilot valve, a single closed fluid conduit extending from the one to the other of said relatively movable parts and operatively connecting said secondary source of fluid pressure to said pilot valve, and means disposed to control the flow of fluid from said secondary source into said conduit whereby said pilot valve may be selectively moved to either operating position in accordance with the pressure impressed thereon by said secondary source to thereby effect control of said mechanism.

9. In a hydraulic control system for a machine tool having a frame and a member carried by said frame in manner to be movable relative thereto, the combination with a power driven element mounted in said frame, of a hydraulically operated clutch disposed to operatively connect said power driven element to actuate said machine, a pump mounted on said frame and connected to actuate said hydraulically operated clutch, a hydraulically operated valve on said frame connected to control the actuation of said clutch by said pump, a second pump mounted on said relatively movable member for actuating said hydraulically operated valve, control mechanism carried by said movable member and associated with said pump in manner to control the actuation of said valve by said pump, and a hydraulic lead connecting said control mechanism on said movable member to said valve on said frame, whereby said hydraulically operated clutch in said frame may be controlled by mechanism carried by said relatively movable member.

10. In a hydraulic control system for a milling machine having a column and a work supporting member carried by said column and movable relative thereto, the combination with a tool supporting spindle rotatably mounted in said column and power driving means therefor, of a hydraulically actuated clutch disposed to selectively connect said driving means to said spindle for rotating it, a pump mounted in said column for providing fluid pressure to actuate said clutch, a hydraulically actuated control valve mounted on said column and connected in manner to control the actuation of said clutch by fluid pressure from said pump, a second pump mounted in said relatively movable work supporting member for providing fluid pressure to actuate said control valve on said column, control mechanism carried by said work support and associated with said second pump in manner to control the fluid pressure exerted thereby for operating said valve, and means connecting said control mechanism on said work support to said control valve on said column for conducting fluid pressure to said valve, whereby operation of said spindle on said column may be controlled by said control mechanism on said relatively movable work supporting member.

11. In a milling machine the combination of a rotatable tool spindle, a reciprocable table, a spindle transmission including an interruptor shiftable to alternative transmission connecting and interrupting positions, a table transmission including a member shiftable to alternative positions respectively for different transmission effect, a plurality of fluid operable shifters respectively for said interruptor and for said member, a first pressure fluid supply source for said interruptor shifter, a first valve means having different positions respectively connecting said first source and interruptor shifter for effecting the different interruptor positions, a second pressure fluid supply source for said member shifter, a second valve means having different positions respectively connecting said second source and member shifter for effecting the different member positions, said member shifter, second pressure source and second valve means being unitarily bodily movable, a single valve controlled flexible channel connecting said bodily movable second source for shifting said first valve means in one direction, and means continuously urging said first valve means in the other direction.

12. In a milling machine having a rotatable spindle and a work support reciprocable in a path transverse to the spindle axis, the combination of a spindle transmission including an interruptor shiftable for alternatively establishing or interrupting spindle rotation, a support transmission including shiftable reverser and rate change means, a plurality of independently operable controllers for said support transmission and respectively for operation of said reverser and of said rate change means, another controller operable for substantially simultaneous operation of said reverser and rate change means, a first fluid operable shifter means for said interruptor, a second fluid operable shifter means for said other controller, first and second fluid supply sources respectively for said interruptor shifter means and for said other controller shifter means, first and second shiftable valve means respectively controlling the connection of said first source and first shifter and of said second source and second shifter, and valve controlled channel means for operation of said first valve means from said second source.

13. In a milling machine having a rotatable spindle and a work support reciprocable in a path transverse to the spindle axis, the combination of a spindle transmission including an interruptor shiftable for alternatively establishing or interrupting spindle rotation, a support transmission including means shiftable for reversing the direction of support movement, a plurality of fluid operable shifter devices respectively connected for movement of said interruptor and of said shiftable reversing means, first and second fluid pressure supply sources respectively connectible with said interruptor shifter device and with said reverser shifter device, first and second shiftable valve means respectively controlling the connection of said first source and interruptor shifter device and of said second source and reverser shifter device, means continuously urging said first valve means in one direction, and valve controlled channel means for connecting said second source to shift said first valve means in the other direction.

14. In a milling machine, a column, a knee projecting from said column, a hollow saddle structure shaped to conform with and to entirely encircle said projecting knee and slidably mounted thereon for horizontal movement the lower part of said hollow structure serving as a reservoir of large capacity for operating liquid, a work supporting table slidably mounted on said saddle for horizontal movement, operating mechanism including feed rate selecting means mounted within said hollow saddle structure and connected to actuate said table, hydraulic control mechanism mounted within said hollow saddle structure and operatively connected to control said operating mechanism, and a pump carried by said saddle and operative to pump liquid from said reservoir to actuate said hydraulic control mechanism.

15. In a machine tool, the combination with a movable element and power driven means for moving said element selectively at a selected feed rate or at rapid traverse rate, of clutch mechanism for selectively connecting said power driven means to operate said movable element, comprising an overrunning clutch device disposed to connect said power means for driving said element at feed rate and arranged to permit operation of said element at rapid traverse rate without interference from said feed rate drive, a friction clutch disposed to selectively connect said power means for driving said element at rapid traverse rate independently of said feed rate drive, and a second friction clutch arranged to frictionally connect said feed rate power means with said element when said first clutch is disengaged to synchronize said element therewith, whereby the rate of travel of said element may be quickly changed from rapid traverse rate to feed rate.

16. In a machine tool having a frame and a movable element carried by said frame, the combination with power driven means for moving said element at a selected feed rate and other power driven means for moving said element at rapid traverse rate, of clutch mechanism for selectively connecting said power driven means in manner to operate said movable element at feed rate or at rapid traverse rate, comprising an overrunning clutch device disposed to connect said feed rate driving means to said movable element to drive it at feed rate and arranged to permit operation of said element at rapid traverse rate without interference from said feed rate driving means, a rapid traverse friction clutch arranged to selectively connect said rapid traverse rate driving means to said movable element to drive it at rapid traverse rate said overrunning clutch functioning to permit rapid traverse movement thereof, and a retarding friction clutch operative to frictionally connect said movable element to said feed rate driving means when said rapid traverse clutch is disengaged to thereby retard said movable element to the speed of said feed rate driving means for effecting driving thereof through said overrunning clutch, whereby the rate of movement of said movable element may be quickly reduced from rapid traverse rate to feed rate to prevent overrunning thereof.

17. In a machine tool having a frame and a movable element carried by said frame, the combination with power driven means for moving said element at a selected feed rate and other power driven means for moving said element at rapid traverse rate, of clutch mechanism for selectively connecting said power driven means in manner to operate said movable element at feed rate or at rapid traverse rate, comprising an overrunning clutch device disposed to connect said feed rate driving means to said movable element to drive it at feed rate and arranged to permit operation of said element at rapid traverse rate without interference from said feed rate driving means, a rapid traverse friction clutch arranged to selectively connect said rapid traverse rate driving means to said movable element to drive it at rapid traverse rate said overrunning clutch functioning to permit rapid traverse movement thereof, a synchronizing friction clutch operative to frictionally connect said movable element to said feed rate driving means, and a hydraulically actuated operating member arranged to effect simultaneous engagement of said synchronizing clutch and disengagement of said rapid traverse clutch, whereby said movable element may be rapidly synchronized with said feed rate driving means to permit said overrunning clutch to quickly resume driving of said element at feed rate without undesirable overtravel of said movable element after termination of movement thereof at rapid traverse rate.

18. In a milling machine having a rotatable spindle and a work support reciprocable in a path transverse to the spindle axis, the combination of a spindle transmission including an interrupter shiftable for alternatively establishing or interrupting spindle rotation, a support transmission including shiftable reverser and rate change means, a plurality of independently operable controllers for said support transmission and respectively for operation of said reverser and of said rate change means, another controller operable for substantially simultaneous operation of said reverser and rate change means, a first fluid operable shifter means for said interrupter, a second fluid operable shifter means for said last mentioned controller, first and second fluid supply sources respectively for said interruptor shifter means and for said last mentioned controller shifter means, first and second shiftable valve means respectively controlling the connection of said first source and first shifter and of said second source and second shifter, means continuously urging said first valve means in one direction, channel means connectible from said second source for operation of said first valve means in the other direction, and valve means controlling the connection of said channel means in accordance with the operation of said last mentioned controller.

19. In a milling machine having a rotatable spindle and a work support reciprocable in a path transverse to the spindle axis, the combination of a spindle transmission including an interruptor shiftable for alternatively establishing or interrupting spindle rotation, a support transmission including a member shiftable for altering the transmission effect, a fluid operable shifter for said interruptor, a pressure fluid supply source connectible for operation of said shifter, a controller shiftable for effecting the shifting of said member, valve means controlling the connection of said fluid source and shifter and movable through a first and a second range of operative movement, a connection for operation of said valve means from said controller, and adjustable means associated with said connection for shifting the valve means relative to said controller to alternatively effect said first or said second range of operative valve movement during a predetermined controller movement.

20. In a milling machine having a rotatable spindle and a work support movable relative thereto, the combination of a spindle transmission including a shiftable motion interruptor, a transmission for said relative movement including a member shiftable for altering the transmission effect, first and second fluid operable shifters respectively for said motion interruptor and for said member, first and second pressure fluid supply sources respectively connectible with said first and second shifters, first and second shiftable valve means respectively controlling the connection of said first and second fluid sources, and means for operation of said first valve means from said second source substantially simultaneously with the operation of said second valve means to connect said second source and second shifter.

21. In a milling machine having a rotatable spindle and a work support movable relative thereto, the combination of a spindle transmission including a shiftable motion interruptor, a transmission for said relative movement including a member shiftable for altering the transmission effect, first and second fluid operable shifters respectively for said motion interruptor and for said member, first and second pressure fluid supply sources respectively connectible with said first and second shifters, first and second shiftable valve means respectively controlling the connection of said first and second fluid sources, control means for operation of said first valve means from said second source substantially simultaneously with the operation of said second valve means to connect said second source and second shifter, and means for selective adjustment of said control means to be ineffective for operation of said first valve means.

22. In a machine tool the combination of a transmission including a member shiftable to alternative positions for altering the transmission effect, a power operable shifter for said member, a power source, control means shiftable to different positions respectively corresponding to the different member positions for connection of said power source and shifter to effect said different positions, a device responsive to changes in fluid pressure and connected for operation of said control means, a pressure fluid channel connected with said device, and a controller device operable for changing the fluid pressure in said channel.

23. In a machine tool having a frame and a movable element carried by said frame, the combination with power driven means for moving said element at a selected feed rate and other power driven means for moving said element at rapid traverse rate, of clutch mechanism for selectively connecting said power driven means in manner to operate said movable element at feed rate or at rapid traverse rate, comprising an overrunning clutch device disposed to connect said feed rate driving means to said movable element to drive it at feed rate and arranged to permit operation of said element at rapid traverse rate without interference from said feed rate driving means, a rapid traverse friction clutch arranged to selectively connect said rapid traverse rate driving means to said movable element to drive it at rapid traverse rate said overrunning clutch functioning to permit rapid traverse movement thereof, a synchronizing friction clutch operative to frictionally connect said movable element to said feed rate driving means, and control means operative to engage said synchronizing clutch simultaneously with disengagement of said rapid traverse clutch to rapidly synchronize said movable element with said feed rate driving means, whereupon said overrunning clutch will quickly resume driving of said movable element at feed rate and over-travel of said movable element will be minimized.

24. In a machine tool having a movable element, a drive mechanism for said movable element comprising element driving means, a feed rate driving member, an overrunning clutch operatively connecting said feed rate driving member to said element driving means, a rapid traverse driving member, a clutch disposed to selectively connect said rapid traverse driving member to said element driving means in manner to drive it faster than said feed rate driving member, and a frictional retarding mechanism operative simultaneously with disengagement of said rapid traverse clutch to quickly retard said element driving means to the speed of said feed rate driving member.

25. In a milling machine, the combination with a column, power driven means mounted in said column, and a rotatable tool spindle carried by said column and operatively connected to be driven by said power driven means; of means for supporting work in cooperative relation to said tool spindle, including a knee element protruding from said column and slidably mounted thereon for movement vertically relative thereto, manually operable means mounted on said knee and disposed to effect said vertical movement thereof, a saddle of generally annular configuration encircling said knee and slidably mounted thereon for movement horizontally toward or from said column, the lower part of said saddle being hollow and constituting a reservoir for lubricant, manually operable means mounted on said knee and disposed to effect said horizontal movement of said saddle, a work supporting table slidably mounted on said saddle for movement horizontally at right angles to the direction of saddle movement, power operated means for effecting said horizontal movement of said table including rate changing mechanism, rapid traverse mechanism, reversing mechanism and automatic control mechanism for said rapid traverse mechanism and said reversing mechanism all mounted in said annular saddle and movable horizontally therewith towards and from said column, means arranged to transmit power from said power driven means in said column to said table moving means in said saddle for actuating said table, and a pump mounted in said saddle and connected to said power transmitting means for actuation thereby, said pump being operative to pump lubricant from the reservoir in the lower part of said saddle for lubricating the mechanism in said saddle and for actuating said automatic control mechanism.

26. In a machine tool the combination of a tool support and a work support, a plurality of transmissions respectively for the different supports and each including a shiftable member, a plurality of fluid operable shifters respectively for the different members, means for shifting one of said support member shifters alternatively in opposite directions including a first pressure fluid supply source connectible therewith and a first shiftable valve means controlling the connection of said first source, means for shifting the other of said support member shifters alternatively in opposite directions including a second pressure fluid supply source and a second shiftable valve means controlling the connection of said second source, means continuously urging said first valve means in one direction, and means for shifting said first valve means in the other direction including a channel connection from said second supply source and shiftable valve means controlling said channel connection, the last mentioned valve means being shiftable in accordance with the shifting of said second valve means.

27. In a machine tool the combination of a tool support and a work support, a plurality of transmissions respectively for the different supports and each including a shiftable member, a plurality of fluid operable shifters respectively for the different members, means for shifting one of said support member shifters alternatively in opposite directions including a first pressure fluid supply source connectible therewith and a first shiftable valve means controlling the connection of said first source, means for shifting the other of said support member shifters alternatively in opposite directions including a second pressure fluid supply source and a second shiftable valve means controlling the connection of said second source, said second supply source and second valve means together with the associated shifter being unitarily bodily movable, means normally urging said first valve means in one direction and means for shifting said first valve means in the other direction including a closed channel connection from said bodily movable second supply source, and shiftable valve means controlling said channel connection to alternatively connect or disconnect said first valve means and second source.

28. In a machine tool the combination of a tool support and a work support, a plurality of transmissions respectively for the different supports and each including a shiftable member, a plurality of fluid operable shifters respectively for the different members, means for shifting one of said support member shifters alternatively in opposite directions including a first pressure fluid supply source connectible therewith and a first shiftable valve means controlling the connection of said first source, means for shifting the other of said support member shifters alternatively in opposite directions including a second pressure fluid supply source and a second shiftable valve means controlling the connection of said second source, said second supply source and second valve means together with the associated shifter being unitarily bodily movable, means normally urging said first valve means in one direction, and means for shifting said first valve means in the other direction including a closed channel connection from said bodily movable second supply source, shiftable valve means controlling said channel connection to alternatively connect or disconnect said first valve means and second source, and a motion transmitting connection for simultaneous movement of the last mentioned valve means and said second valve means.

29. In a milling machine the combination of a rotatable tool spindle, a reciprocable table, a spindle transmission including an interrupter shiftable to alternative transmission connecting and interrupting positions, a table transmission including a member shiftable to alternative positions respectively for different transmission effect, a plurality of fluid operable shifters respectively for said interrupter and for said member, a first pressure fluid supply source for said interrupter shifter, a first valve means having different positions respectively connecting said first source and interrupter shifter for effecting the different interrupter positions, a second pressure fluid supply source for said member shifter, a second valve means having different positions respectively connecting said second source and member shifter for effecting the different member positions, and valve controlled channel means connecting said second source for shifting said first valve means.

30. In a milling machine the combination of a rotatable tool spindle, a reciprocable table, a spindle transmission including an interrupter shiftable to alternative transmission connecting and interrupting positions, a table transmission including a member shiftable to alternative positions respectively for different transmission effect, a plurality of fluid operable shifters respectively for said interrupter and for said member, a first pressure fluid supply source for said interruptor shifter, a first valve means having different positions respectively connecting said first source and interruptor shifter for effecting the different interruptor positions, a second pressure fluid supply source for said member shifter, a second valve means having different positions respectively connecting said second source and member shifter for effecting the different member positions, means continuously urging said first valve means in one direction, and means for shifting said first valve means in the other direction including a valve controlled channel connecting said first valve means and said second fluid source.

31. In a milling machine having a rotatable spindle and a work support reciprocable in a path transverse to the spindle axis, the combination of a spindle transmission including an interruptor shiftable for alternatively establishing or interrupting spindle rotation, a support transmission including means shiftable for reversing the direction of support movement, a plurality of fluid operable shifter devices respectively connected for movement of said interruptor and of said shiftable reversing means, first and second fluid pressure supply sources respectively connectible with said interruptor shifter device and with said reverser shifter device, first and second shiftable valve means respectively controlling the connection of said first source and interruptor shifter device and of said second source and reverser shifter device, and valve controlled channel means for connecting said second source for operation of said first valve means from said second fluid supply source.

32. In a milling machine having a rotatable spindle and a work support reciprocable in a path transverse to the spindle axis, the combination of a spindle transmission including an interruptor shiftable for alternatively establishing or interrupting spindle rotation, a support transmission including means shiftable for changing the rate of support movement, a plurality of fluid operable shifter devices respectively connected for operation of said interruptor and of said shiftable rate change means, first and second fluid supply sources respectively connectible with said interruptor shifter device and with said rate change shifter device, first and second shiftable valve means respectively controlling the connection of said first source and interruptor shifter device and of said second source and rate change shifter device, and valve controlled channel means for connecting said second source for operation of said first valve means.

33. In a milling machine having a rotatable spindle and a work support reciprocable in a path transverse to the spindle axis, the combination of a spindle transmission including an interruptor shiftable for alternatively establishing or interrupting spindle rotation, a support transmission including means shiftable for changing the rate of support movement, a plurality of fluid operable shifter devices respectively connected for operation of said interruptor and of said shiftable rate change means, first and second fluid supply souurces respectively connectible with said interruptor shifter device and with said rate change shifter device, first and second shiftable valve means respectively controlling the connection of said first source and interruptor shifter device and of said second source and rate change shifter device, means normally urging said first valve means in one direction, and valve controlled channel means for connecting said second source to shift said first valve means in the other direction.

34. In a milling machine having a rotatable spindle and a work support reciprocable in a path transverse to the spindle axis, the combination of a spindle transmission including an interruptor shiftable for alternatively establishing or interrupting spindle rotation, a support transmission including shiftable reverser and rate change means, a plurality of independently operable controllers for said support transmission and respectively for operation of said reverser and of said rate change means, another controller operable for substantially simultaneous operation of said reverser and rate change means, a first fluid operable shifter means for said interruptor, a second fluid operable shifter means for said last mentioned controller, first and second fluid supply sources respectively for said interruptor shifter means and for said last mentioned controller shifter means, first and second shiftable valve means respectively controlling the connection of said first source and first shifter and of said second source and second shifter, means continuously urging said first valve means in one direction, and valve controlled channel means connecting said second source for operation of said first valve means in the other direction.

35. In a milling machine having a rotatable spindle and a work support reciprocable in a path transverse to the spindle axis, the combination of a spindle transmission including an interruptor shiftable for alternatively establishing or interrupting spindle rotation, a support transmission including shiftable reverser and rate change means, a plurality of independently operable controllers for said support transmission and respectively for operation of said reverser and of said rate change means, another controller operable for substantially simultaneous operation of said reverser and rate change means, a first fluid operable shifter means for said interruptor, a second fluid operable shifter means for said last mentioned controller, first and second fluid supply sources respectively for said interruptor shifter means and for said last mentioned controller shifter means, first and second shiftable valve means respectively controlling the connection of said first source and first shifter and of said second source and second shifter, said second supply source being bodily movable relative to said first valve means, means normally continuously urging said first valve means in one direction, and valve controlled channel means connecting said second supply source for movement of said first valve means in the other direction in various positions of their relative movement.

36. In a milling machine having a rotatable spindle and a work support reciprocable in a path transverse to the spindle axis, the combination of a spindle transmission including an interruptor shiftable for alternatively establishing or interrupting spindle rotation, a support transmission including shiftable reverser and rate change means, a plurality of independently operable controllers for said support transmission and respectively for operation of said reverser and of said rate change means, another controller operable for substantially simultaneous operation of said reverser and rate change means, a first fluid operable shifter means for said interruptor, a second fluid operable shifter means for said last mentioned controller, first and second fluid supply sources respectively for said interruptor shifter means and for said last-mentioned controller shifter means, first and second shiftable valve means respectively controlling the connection of said first source and first shifter and of said second source and second shifter, channel means connectible for operation of said first valve means from said second source, and valve means controlling the connection of said channel means in accordance with the operation of said last-mentioned controller.

37. A milling machine comprising a column, a knee protruding horizontally from said column, a thin saddle plate slidably mounted on said knee for horizontal movement toward and from said column, a work carrying table slidably mounted on said thin saddle plate for horizontal movement transversely of said column said table being positioned on said saddle plate at minimum height above said knee for supporting work close to said knee to insure rigidity and to prevent vibration during a cutting operation, and a reinforcing member extending beneath said knee and connected at its ends to said saddle plate at each side of said knee in manner to constitute a truss member functioning to stiffen said saddle plate and prevent bending thereof, whereby said saddle plate may be thinner than would be possible without the cooperation of said reinforcing member in providing the required rigidity the work being thereby supported correspondingly closer to the top of the knee.

38. A milling machine comprising a column, a work supporting structure including a knee slidably mounted on said column in manner to provide for vertical adjustment thereof, a work supporting table carried by said knee, a relatively thin saddle plate interposed between said knee and said table to support said table at minimum distance above said knee and to provide for horizontal movement of said table along two paths, and a reinforcing member for said saddle plate said member being attached at its ends to the respective ends of said saddle plate and extending beneath said knee to constitute a truss reinforcing and stiffening said saddle plate, whereby said table may be supported at minimum height above said knee by reason of said reinforced saddle plate being relatively thin thereby improving the rigidity of the work supporting structure.

39. A milling machine comprising a column, a forwardly projecting knee slidably mounted on said column, a relatively shallow saddle plate slidably mounted on the top of said knee, a table slidably mounted on the top of said saddle plate, and a saddle reinforcing member secured to said saddle plate at each side of said knee and extending beneath said knee to constitute with said plate a rigid saddle structure having a deep box section, whereby said shallow saddle plate is adapted to support said table rigidly close to the top of said knee in manner to afford more rigid support for a workpiece.

40. A milling machine including a column, a tool spindle rotatably mounted in said column, a knee slidably mounted on said column for vertical movement relative to said spindle, a saddle structure slidably mounted on said knee for movement toward or from said column and a work supporting table slidably carried by said saddle in cooperative relationship with said spindle, said saddle structure comprising a relatively thin saddle plate interposed between the top of said knee and said work table, and a yoke member extending beneath said knee and attached to said plate at each side of said knee in manner to stiffen and reinforce said plate.

41. A milling machine comprising a column, a vertically adjustable knee on said column, a saddle slidably mounted on said knee for movement toward and from said column, and a work supporting table slidably mounted on said saddle for movement in a path transverse to that of the saddle movement, said saddle comprising a relatively thin table supporting plate guided for movement on the top of said knee and a body portion attached to said plate and surrounding the remaining sides of said knee, whereby said saddle is provided with rigidity far in excess of that afforded by the relatively thin table supporting plate acting alone.

42. A milling machine comprising a column, a vertically adjustable knee on said column, a saddle slidably mounted on said knee for movement toward and from said column, and a work supporting table slidably mounted on said saddle for movement in a path transverse to that of the saddle movement, said saddle comprising a relatively thin table supporting plate guided for movement on the top of said knee and having end portions extending beyond each side of said knee, and a hollow body portion attached to the overhanging ends of said relatively thin plate, said body portion surrounding the knee and having an inner wall closely adjacent to said knee and an outer wall spaced from said inner wall, whereby said relatively thin table supporting plate is reinforced in manner to provide adequate rigidity in the saddle to withstand cutting pressures.

43. In a milling machine of the type having a column, a knee slidably mounted for vertical movement on said column, a saddle slidably mounted for horizontal cross movement on said knee, and a table slidably mounted for horizontal longitudinal movement on the top of said saddle, a saddle structure comprising a hollow top member housing tripping mechanism and having sliding engagement with the top of said knee, a hollow side member depending from said top member at one side of said knee and housing actuating mechanism for said table, a hollow side member depending from said top member at the other side of said knee and housing control mechanism for said table actuating mechanism, and a hollow lower cross member disposed beneath said knee with its ends joined to said depending side members and constituting a reservoir for lubricant.

44. In a hydraulic control system for a machine tool, the combination with a fluid pressure actuated mechanism, of a primary source of fluid pressure for actuating said mechanism, a fluid pressure actuated pilot valve disposed to control the application of pressure from said primary source to said mechanism, a secondary source of fluid pressure, a single fluid channel operatively connecting said secondary source of fluid pressure to said pilot valve for actuating it, and a control valve disposed to control the flow of pressure fluid into said channel for flowing therethrough to said pilot valve to thereby effect control of said pressure actuated mechanism.

45. In a machine tool, the combination with an adjustable mechanism and power operated means for effecting adjustment of said mechanism, of fluid pressure actuated control means for controlling said power operated adjusting means, a

CERTIFICATE OF CORRECTION.

Patent No. 2,215,684.　　　　　　　　　　　September 24, 1940.

JOSEPH B. ARMITAGE.

It is hereby certified that error appears in the printed specification of the above numbered patent requiring correction as follows: Page 1, second column, line 36, and page 19, first column, line 19, claim 60, for "alternately" read --alternatively--; page 9, first column, line 66, and second column, line 35, for "port 33" read --port 333--; line 73, for "lnes" read --lines--; and that the said Letters Patent should be read with this correction therein that the same may conform to the record of the case in the Patent Office.

Signed and sealed this 12th day of November, A. D. 1940.

Henry Van Arsdale,
(Seal)　　　　　　　　　　　　　　　　Acting Commissioner of Patents.

of said valve to predetermine the mode of control effected by movement of said lever.

60. In a milling machine the combination of a base, a work table carried by said base and guided for reciprocatory movement, a spindle support uprising adjacent a longitudinal edge of said table, a rotatable tool spindle axially transverse to the path of reciprocatory table movement and carried by said spindle support at a level above said table, a drive train for actuating said spindle including clutch means shiftable for establishing or for interrupting spindle rotation, shifter means for shifting said clutch means, a power source connectible for operation of said shifter means, transmission mechanism for said table, control means for said table transmission mechanism and individually operable control means for connection of said power source and shifter means to alternately effect the rotation establishing or the interrupting position of said clutch means and including a lever having a hand grip portion positioned adjacent the other longitudinal edge of said table.

61. In a milling machine the combination of a base, a work table carried by said base and guided for reciprocatory movement, a spindle support uprising adjacent a longitudinal edge of said table, a rotatable tool spindle axially transverse to the path of reciprocatory table movement and carried by said spindle support at a level above said table, a drive train for actuating said spindle including clutch means shiftable for establishing or for interrupting spindle rotation, shifter means for shifting said clutch means, a power source connectible for operation of said shifter means, transmission mechanism for actuation of said table, a control device for said table transmission, control means for connection of said power source and shifter means to alternatively effect the rotation establishing or the interrupting position of said clutch means, said control device and control means being independently operable and including two hand levers respectively for operation of the control device and of the control means, each of said hand levers including a hand grip portion positioned adjacent the other longitudinal edge of said table.

62. In a milling machine the combination of a base, a work table carried by said base and guided for reciprocatory movement, a spindle support uprising adjacent a longitudinal edge of said table, a rotatable tool spindle disposed axially transverse to the path of said reciprocatory table movement and carried by said spindle support at a level above said table, a drive train for actuating said spindle including clutch means shiftable for establishing or for interrupting spindle rotation, shifter means for shifting said clutch means, a power source connectible for operation of said shifter means, transmission mechanism for actuation of said table, a control device for said table transmission, control means for connection of said power source and shifter means to alternatively effect the rotation establishing or interrupting position of said clutch means, said control means and control device including two hand levers each having a hand grip portion positioned adjacent the other longitudinal edge of said table and respectively for operating said control device and operating said control means, and control mechanism adjustable for establishing a dependent operation of said control means in accordance with the operation of said control device, said control mechanism being alternatively adjustable for interrupting said dependent operation for said hand levers respectively to independently operate said control device and said control means.

63. In a hydraulic control system for a milling machine having a column and a work supporting member carried by said column and movable relative thereto, the combination with a tool supporting spindle rotatably mounted in said column and power driving means therefor, of a power actuated shifter disposed to be operated selectively to change the driving effect of said driving means upon said spindle, a hydraulically actuated control member mounted in said column and operatively connected to control the actuation of said power operated shifter said control member being continuously urged in one direction, a source of hydraulic pressure fluid mounted in said movable work supporting member for actuating said control member, control mechanism carried by said work supporting member and associated with said pressure source in manner to control the flow of pressure fluid for controlling the position of said shifter control member, and a single hydraulic lead connecting said control mechanism on said movable work supporting member to said control member in said column, whereby hydraulic pressure admitted through said single lead may move said control member in direction opposite to that in which it is continuously urged for controlling said power actuated shifter.

64. In a hydraulic control system for a milling machine having a column and a work supporting member carried by said column and movable relative thereto, the combination with a tool supporting spindle rotatably mounted in said column and power driving means therefor, of a power actuated shifter disposed to be operated selectively to change the driving effect of said driving means upon said spindle, a hydraulically actuated control member mounted in said column and operatively connected to control the actuation of said power operated shifter said control member being continuously urged in one direction, a source of hydraulic pressure fluid mounted in said movable work supporting member for actuating said control member, control mechanism carried by said work supporting member and associated with said pressure source in manner to control the flow of pressure fluid for controlling the position of said shifter control member, automatic means responsive to movement of said work supporting member and operative to actuate said control mechanism, manually actuatable means carried by said work supporting member and operatively connected to actuate said control mechanism, and a single hydraulic lead connecting said control mechanism on said movable work supporting member to said control member in said column, whereby hydraulic pressure admitted through said single lead may move said control member in direction opposite to that in which it is continuously urged thereby controlling said power actuated shifter.

65. In a hydraulic control system for a milling machine having a column and an associated work supporting member, the combination with a tool supporting spindle rotatably mounted in said column and power driving means therefor, of a power operated shifter disposed to be actuated selectively to change the driving effect of said driving means upon said spindle, a hydraulically actuated control member operatively connected to control the actuation of said power operated shifter said control member being continuously urged in one direction, a source of hydraulic pressure fluid for actuating said control member, control mechanism associated with said pressure source in manner to control the flow of pressure fluid for changing the position of said shifter control member, and a single hydraulic lead connecting said control mechanism to said control member, whereby said power operated shifter may be controlled by hydraulic pressure admitted through said single lead to move said control member in direction opposite to that in which it is continuously urged.

66. In a milling machine the combination of a stationary column, a knee supported from said column and guided for bodily vertical movement, a work table carried by said knee and guided for horizontal reciprocatory movement, said column providing a spindle support portion uprising adjacent a longitudinal edge of said table, a rotatable tool spindle axially transverse to the path of said table reciprocatory movement and carried by said spindle support portion at a level above said table, a spindle train including a member shiftable for alternatively effecting spindle power rotation or applying a brake to stop said spindle, power operable shifter means for said member, a power source connectible with said shifter means, transmission mechanism for said table, control means for said transmission mechanism including a hand lever carried by said knee for bodily movement therewith, and individually operable control means for connection of said power source and shifter means to alternatively effect the spindle rotating or brake applying positions of said shiftable member, said individually operable control means including a hand lever carried by said knee for bodily movement therewith and providing a hand grip portion exposed adjacent the other longitudinal edge of said table.

67. In a milling machine the combination of a stationary column, a knee supported from said column and guided for bodily vertical movement, a work table carried by said knee and guided for horizontal reciprocatory movement, said column providing a spindle support portion uprising adjacent a longitudinal edge of said table, a rotatable tool spindle axially transverse to the path of said table reciprocatory movement and carried by said spindle support portion at a level above said table, a spindle train including a member shiftable for alternatively effecting spindle power rotation or applying a brake to stop said spindle, power operable shifter means for said member, a power source connectible with said shifter means, transmission mechanism for said table, control means for said table transmission mechanism, a control device for connection of said power source and shifter to alternatively effect the spindle rotating or brake applying position of said member, said control means and control device including two hand levers each carried by said knee for bodily movement therewith and respectively for operation of the control means and the control device, each of said hand levers including a hand grip portion exposed adjacent the other longitudinal edge of said table, and other control mechanism adjustable for connection of said control means and control device to effect a dependent operation of said control device in accordance with operation of said control means, said other control mechanism providing an alternative adjustment disconnecting said control means and control device.

68. In a machine tool the combination of a movable support, a feed rate element, positive means for connecting said element and support, friction means for connecting said element and support, means for actuation of said support at relatively fast rate, and control means for effecting actuation of said support from said relatively fast means or alternatively to connect said feed rate element and support through said friction means and subsequently through said positive means.

69. In a machine tool having a movable support, a feed rate changer for driving said support, an overrunning clutch disposed to connect said feed rate changer to drive said support, friction means selectively operable to connect said feed rate changer to drive said support, means selectively operable to actuate said support at relatively fast rate, and selective control means operable to effect actuation of said support by said relatively fast rate means or alternatively to connect said feed rate changer to drive said support first by means of said friction means and subsequently by means of said overrunning clutch.

70. In a machine tool having a frame and a movable element carried by said frame, the combination with power driven means for moving said element at a selected feed rate and other power driven means for moving said element at rapid traverse rate, of clutch mechanism for connecting either of said power driven means to said movable element selectively in manner to operate said element at feed rate or at rapid traverse rate alternatively, said clutch mechanism comprising a rapid traverse friction clutch operative to connect said rapid traverse rate driving means to said movable element to drive it at rapid traverse rate and a synchronizing friction clutch operative to connect said movable element to said feed rate driving means to retard said element, and a direct acting hydraulic operating mechanism arranged to engage said friction clutches alternatively by exerting direct pressure upon either of them selectively in manner effecting automatic take-up thereof, whereby said synchronizing friction clutch may be engaged substantially simultaneously with disengagement of said rapid traverse clutch to synchronize said movable element with said feed rate driving means smoothly and rapidly with uniform action and without undesirable overtravel of said movable element after termination of movement thereof at rapid traverse rate.

JOSEPH B. ARMITAGE.

CERTIFICATE OF CORRECTION.

Patent No. 2,215,684.　　　　　　　　　　　　　September 24, 1940.

JOSEPH B. ARMITAGE.

It is hereby certified that error appears in the printed specification of the above numbered patent requiring correction as follows: Page 1, second column, line 36, and page 19, first column, line 19, claim 60, for "alternately" read --alternatively--; page 9, first column, line 66, and second column, line 35, for "port 33" read --port 333--; line 73, for "lnes" read --lines--; and that the said Letters Patent should be read with this correction therein that the same may conform to the record of the case in the Patent Office.

Signed and sealed this 12th day of November, A. D. 1940.

Henry Van Arsdale,
　　　　　　　　　　　　　　　　　　　Acting Commissioner of Patents.

(Seal)